United States Patent
Takahashi et al.

(10) Patent No.: US 10,892,852 B2
(45) Date of Patent: Jan. 12, 2021

(54) COMMUNICATION APPARATUS, COMMUNICATION METHOD, PROGRAM, AND COMMUNICATION SYSTEM

(71) Applicant: Sony Corporation, Tokyo (JP)

(72) Inventors: Hiroo Takahashi, Kanagawa (JP); Takashi Yokokawa, Kanagawa (JP); Sonfun Lee, Kanagawa (JP); Naohiro Koshisaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 133 days.

(21) Appl. No.: 16/094,944

(22) PCT Filed: May 2, 2017

(86) PCT No.: PCT/JP2017/017219
§ 371 (c)(1),
(2) Date: Oct. 19, 2018

(87) PCT Pub. No.: WO2017/199759
PCT Pub. Date: Nov. 23, 2017

(65) Prior Publication Data
US 2019/0123858 A1   Apr. 25, 2019

(30) Foreign Application Priority Data

May 18, 2016   (JP) .................................. 2016-099953

(51) Int. Cl.
*G06F 11/10*   (2006.01)
*H03M 13/00*   (2006.01)
(Continued)

(52) U.S. Cl.
CPC ........ *H04L 1/0061* (2013.01); *G06F 13/4291* (2013.01); *H04L 7/041* (2013.01); *G06F 2213/0016* (2013.01); *H04L 2001/125* (2013.01)

(58) Field of Classification Search
CPC ............. G06F 13/4282; G06F 13/4291; G06F 2213/0016; H04L 1/0061; H04L 7/041; H04L 2001/125
See application file for complete search history.

(56) References Cited

U.S. PATENT DOCUMENTS 6,456,677 B1 *   9/2002   Hiramatsu ............ H04L 7/0054
                                                      375/354
7,023,940 B2 *   4/2006   Nakamura .......... H04L 27/2332
                                                      375/354
(Continued)

FOREIGN PATENT DOCUMENTS

JP   2000-099448 A   4/2000
JP   2002-175269 A   6/2002

OTHER PUBLICATIONS

NXP Semiconductors, "UM10204 I2C-bus specification and user manual Rev. 6—Apr. 4, 2014," NXP Semiconductors N.V. 2014, Published Apr. 4, 2014, pp. 1-64 (Year: 2014).*

(Continued)

*Primary Examiner* — Albert Decady
*Assistant Examiner* — Enamul M Kabir
(74) *Attorney, Agent, or Firm* — Michael Best & Friedrich LLP

(57) ABSTRACT

A master includes a transmission and receiving unit that transmits and receives signals to and from a slave, and the transmission and receiving unit receives read data read out from the slave, and typically drives the second bit of a preamble transmitted/received subsequent to the read data. The master can notify the slave that communication is or is not interrupted at some midpoint, on the basis of the second bit of the preamble. The present technology can be applied to a bus IF that communicates pursuant to, for example, the specification of I3C.

20 Claims, 17 Drawing Sheets

(51) Int. Cl.
    *H04L 1/00*     (2006.01)
    *G06F 13/42*     (2006.01)
    *H04L 7/04*     (2006.01)
    *H04L 1/12*     (2006.01)

(56) References Cited

U.S. PATENT DOCUMENTS

2015/0100711 A1     4/2015   Sengoku
2017/0255588 A1*   9/2017   Pitigoi-Aron ......... G06F 13/364

OTHER PUBLICATIONS

E. T. Nana, "New Serial Bus for Sensor Interface in Mobile and Electronic Equipment," Public Use, NXP—FTF 2016 Technology Forum, pp. 1-28, May 18, 2016.
NXP Semiconductors—UM10204: "I2C-Bus specification and user manual," pp. 1-64, Apr. 4-6, 2014.

* cited by examiner

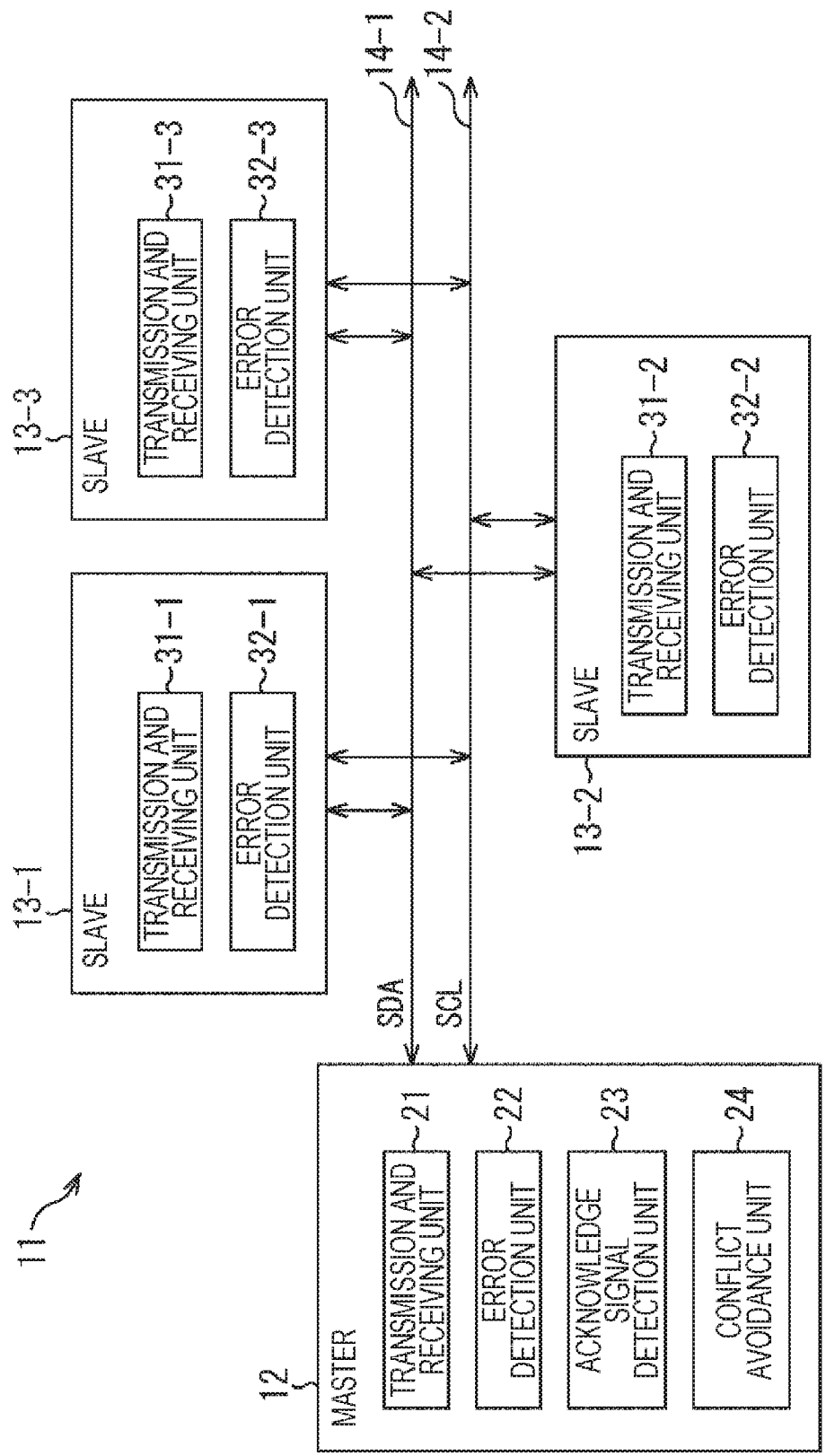

FIG. 2

| | DRIVE SUBJECT | SEMANTICS | High Keeper | RECEIVER |
|---|---|---|---|---|
| After EnterHDR Pre[1] | Master | 0: Command Word follows<br>1: Reserved | Don't care | Slave |
| After EnterHDR Pre[0] | Master | 0: Reserved<br>1: Command Word follows | Don't care | Slave |
| After Read CMD Pre[1] | Master | 0: Reserved<br>1: Data follows | Don't care | Slave |
| After Read CMD Pre[0] | Slave | 0: Slave ACK<br>1: Slave NACK | ON (REQUISITE) | Master |
| After Read DATA Pre[1] | Slave | 0: CRC Word follows<br>1: Data follows | Don't care | Master |
| After Read DATA Pre[0] | Master | 0: Master aborts<br>1: Master doesn't abort | ON (NOT REQUISITE. (TO AVOID INDEFINITION)) | Slave doesn't use this value. |
| After Write CMD Pre[1] | Master | 0: Reserved<br>1: Data follows | Don't care | Slave |
| After Write CMD Pre[0] | Master | 0: Data follows<br>1: Reserved | Don't care | Slave |
| After Write DATA Pre[1] | Master | 0: CRC Word follows<br>1: Data follows | Don't care | Slave |
| After Write DATA Pre[0] | Master | 0: Reserved<br>1: CRC Word or Data follows | Don't care | Slave |

FIG. 3

| | | DRIVE SUBJECT | SEMANTICS | High Keeper | RECEIVER |
|---|---|---|---|---|---|
| After EnterHDR | Pre[1] | Master | 0: Command Word follows<br>1: Reserved | Don't care | Slave |
| | Pre[0] | Master | 0: Reserved<br>1: Command Word follows | Don't care | Slave |
| After Read CMD | Pre[1] | Master | 0: Reserved<br>1: Data follows | Don't care | Slave |
| | Pre[0] | Slave | 0: Slave ACK<br>1: Slave NACK | ON (REQUISITE) | Master |
| After Read DATA | Pre[1] | Slave | 0: CRC Word follows<br>1: Data follows | Don't care | Master |
| | Pre[0] | Master | 0: Master aborts<br>1: Master doesn't abort | ON (NOT REQUISITE (TO AVOID INDEFINITION)) | Slave doesn't use this value. |
| After Write CMD | Pre[1] | Master | 0: Reserved<br>1: Data follows | Don't care | Slave |
| | Pre[0] | Master | 0: Data follows<br>1: Reserved | Don't care | Slave |
| After Write DATA | Pre[1] | Master | 0: CRC Word follows<br>1: Data follows | Don't care | Slave |
| | Pre[0] | Master | 0: Data follows<br>1: CRC Word follows | Don't care | Slave |

FIG. 12

| | | DRIVE SUBJECT | SEMANTICS | High Keeper | RECEIVER |
|---|---|---|---|---|---|
| After EnterHDR | ppr | Master | | | |
| | Pre[1] | Master | 0: Command Word follows<br>1: Reserved | Don't care | Slave |
| | Pre[0] | Master | 0: Reserved<br>1: Command Word follows | Don't care | Slave |
| After Read CMD | ppr | Master | 0: Reserved<br>1: Data follows | Don't care | Slave |
| | Pre[1] | Slave | 0: Slave ACK<br>1: Slave NACK | ON | Master |
| | Pre[0] | Slave | 0: Slave ACK<br>1: Slave NACK | ON | Master |
| After Read DATA | ppr | Slave | 0: CRC Word follows<br>1: Data follows | Don't care | Master |
| | Pre[1] | Slave | 0: CRC Word follows<br>1: Data follows | Don't care | Master |
| | Pre[0] | Master | 0: Master aborts<br>1: Master doesn't abort | Don't care | Slave doesn't use this value. |
| After Write CMD | ppr | Master | 0: Reserved<br>1: Data follows | Don't care | Slave |
| | Pre[1] | Master | 0: Reserved<br>1: Data follows | Don't care | Slave |
| | Pre[0] | Master | 0: Data follows<br>1: Reserved | Don't care | Slave |
| After Write DATA | ppr | Master | 0: CRC Word follows<br>1: Data follows | Don't care | Slave |
| | Pre[1] | Master | 0: CRC Word follows<br>1: Data follows | Don't care | Slave |
| | Pre[0] | Master | 0: Reserved<br>1: CRC Word or Data follows | Don't care | Slave |

COMMUNICATION APPARATUS, COMMUNICATION METHOD, PROGRAM, AND COMMUNICATION SYSTEM

TECHNICAL FIELD

The present disclosure relates to a communication apparatus, a communication method, a program, and a communication system, and particularly relates to a communication apparatus, a communication method, a program, and a communication system that ensure communication more reliably.

CROSS REFERENCE TO RELATED APPLICATIONS

This application claims the benefit of Japanese Priority Patent Application JP 2016-099953 filed on May 18, 2016, the entire contents of which are incorporated herein by reference.

BACKGROUND ART

For example, the inter-integrated circuit (I2C) has been widely used as a bus interface (IF) used for communication between devices via a bus within a board on which a plurality of devices is mounted.

Moreover, in recent years, the achievement of an increase in the speed of I2C has been desired. The specification of the improved inter integrated circuit (I3C) is being laid down as the next generation standard. In I3C, a master and a slave can communicate bidirectionally with two signal lines. For example, a data transfer (write transfer) from the master to the slave, and a data transfer (read transfer) from the slave to the master are performed.

For example, PTL 1 discloses a digital data processing system that interconnects a host processor and a subsystem controller by I2C. Moreover, PTL 2 discloses a method for implementing a communication protocol placed in layers above the standard I2C protocol.

CITATION LIST

Patent Literature

PTL 1: JP 2000-99448 A
PTL 2: JP 2002-175269 A

SUMMARY OF INVENTION

Technical Problem

Incidentally, in the above-mentioned I3C, it is specified that the master and the slave detect errors by, for example, parity and a cyclic redundancy check (CRC). However, signals that do not have measures for such error detection are also transmitted and received. Hence, when an error occurs in a signal that does not have a measure for error detection, the master and the slave may become impossible to perform normal communication.

The present disclosure has been made considering such circumstances. It is desirable to ensure communication more reliably.

Solution to Problem

A communication apparatus according to a first aspect of the present disclosure includes a transmission and receiving unit configured to transmit and receive signals to and from another communication apparatus, and the transmission and receiving unit receives read data read out from the other communication apparatus, and typically drives the second bit of a preamble transmitted/received subsequent to the read data.

A communication method or a program according to the first aspect of the present disclosure causes a computer to execute a communication process including causing a transmission and receiving unit configured to transmit and receive signals to and from another communication apparatus to: receive read data read out from the other communication apparatus; and typically drive the second bit of a preamble transmitted/received subsequent to the read data.

In the first aspect of the present disclosure, the transmission and receiving unit configured to transmit and receive signals to and from the other communication apparatus receives read data read out from the other communication apparatus, and typically drives the second bit of the preamble transmitted/received subsequent to the read data.

A communication system according to a second aspect of the present disclosure includes: a first communication apparatus having an initiative of control over a bus; and a second communication apparatus configured to communicate under control of the first communication apparatus, the first communication apparatus includes a transmission and receiving unit configured to transmit and receive signals to and from the second communication apparatus, and the transmission and receiving unit receives read data read out from the second communication apparatus, and typically drives the second bit of a preamble transmitted/received subsequent to the read data.

In the second aspect of the present disclosure, communication is performed by the first communication apparatus having the initiative of control over the bus and the second communication apparatus configured to communicate under control of the first communication apparatus. In addition, the first communication apparatus includes the transmission and receiving unit configured to transmit and receive signals to and from the second communication apparatus. The transmission and receiving unit receives the read data read out form the second communication apparatus, and typically drives the second bit of the preamble transmitted/received subsequent to the read data.

Advantageous Effects of Invention

According to the first and second aspects of the present disclosure, communication is ensured more reliably.

BRIEF DESCRIPTION OF DRAWINGS

FIG. 1 is a block diagram illustrating a configuration example of one embodiment of a bus IF to which the present technology is applied.

FIG. 2 is a diagram illustrating first definition examples of preambles.

FIG. 3 is a diagram illustrating modifications of the first definition examples of the preambles.

FIG. 12 is a diagram illustrating second definition examples of the preambles.

DESCRIPTION OF EMBODIMENTS

Figure 4:
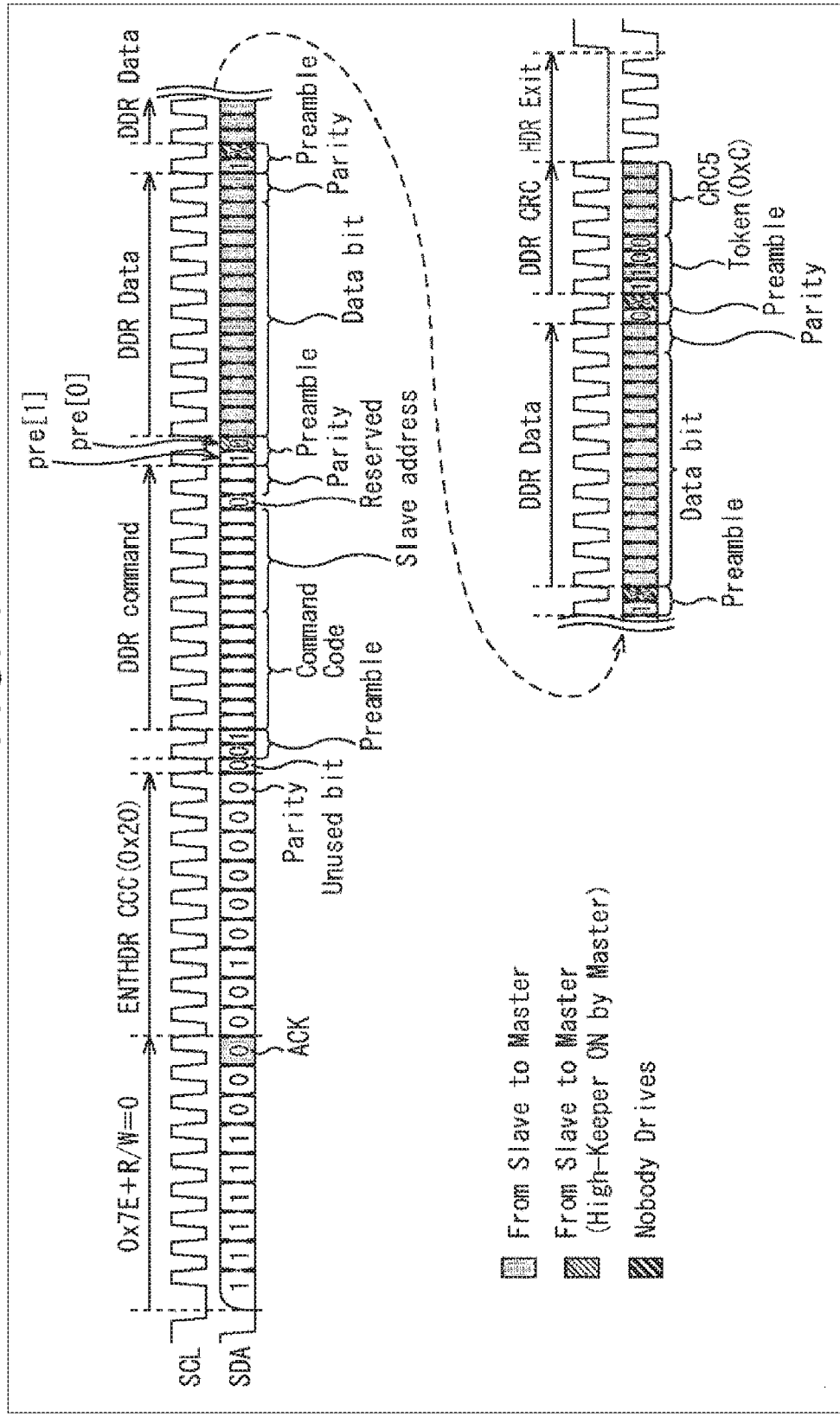
FIG. 4 is a diagram illustrating a timing chart at the time of a read transfer.

A specific embodiment to which the present technology is applied is described in detail hereinafter with reference to the drawings.

<Configuration Example of a Bus IF>

FIG. 1 is a block diagram illustrating a configuration example of one embodiment of a bus IF to which the present technology is applied.

A bus IF 11 illustrated in FIG. 1 is configured to connect a master 12 and three slaves 13-1 to 13-3 via a data signal line 14-1 and a clock signal line 14-2.

The master 12 has an initiative of control over the bus IF 11, and can communicate with the slaves 13-1 to 13-3 via the data signal line 14-1 and the clock signal line 14-2.

The slaves 13-1 to 13-3 can communicate with the master 12 via the data signal line 14-1 and the clock signal line 14-2 under control of the master 12. Incidentally, the slaves 13-1 to 13-3 are similarly configured. When there is no need to distinguish them, they are hereinafter simply referred to as the slave 13. The same shall apply to blocks forming the slave 13.

The data signal line 14-1 and the clock signal line 14-2 are used to transmit signals between the master 12 and the slave 13. In the bus IF 11, for example, serial data (serial data: SDA) is transmitted sequentially bit by bit, via the data signal line 14-1, and a serial clock (serial clock: SCL) at a predetermined frequency is transmitted via the clock signal line 14-2.

Moreover, in the bus IF 11, a plurality of transmission modes of which communication speeds are different are specified pursuant to the specification of I3C. The master 12 can switch these transmission modes. In the bus IF 11, for example, a standard data rate (SDR) mode where data is communicated at a normal transfer rate, and a high data rate (HDR) mode where data is communicated at a higher transfer rate than the SDR mode are specified according to the data transfer rates. Moreover, in HDR mode, three modes of a double data rate (DDR) mode, a ternary symbol pure-bus (TSP) mode, and a ternary symbol legacy-inclusive-bus (TSL) mode are defined in the specification. Incidentally, it is specified that communication is performed in SDR mode in the bus IF 11 at the start of communication.

The master 12 is configured to include a transmission and receiving unit 21, an error detection unit 22, an acknowledge signal detection unit 23, and a conflict avoidance unit 24.

The transmission and receiving unit 21 transmits and receives signals to and from the slave 13 via the data signal line 14-1 and the clock signal line 14-2. The transmission and receiving unit 21, for example, drives the data signal line 14-1 (switches the potential to the H or L level) in synchronization with a timing of a serial clock that is transmitted by driving the clock signal line 14-2, and accordingly transmits a signal to the slave 13. Moreover, the slave 13 drives the data signal line 14-1 in synchronization with the timing of the serial clock of the clock signal line 14-2; accordingly, the transmission and receiving unit 21 receives a signal transmitted from the slave 13. Incidentally, the master 12 side typically drives the clock signal line 14-2.

The error detection unit 22 detects an error occurring in a signal received by the transmission and receiving unit 21. The error detection unit 22 can detect an error by, for example, performing a parity check, cyclic redundancy check (CRC), or the like on a signal received by the transmission and receiving unit 21, or checking a token that is issued when a transmission right is passed on from the slave 13 to the master 12. In addition, the error detection unit 22 can, for example, instruct the transmission and receiving unit 21 to redo communication with the slave 13 from the beginning when having detected that the error is occurring in the signal received by the transmission and receiving unit 21.

For example, the error detection unit 22 performs a parity check on data received by the transmission and receiving unit 21, setting one of two-bit parity included in data transmitted from the slave 13 as even parity and the other as odd parity. Accordingly, the error detection unit 22 can detect the occurrence of an error. Consequently, even if there arises a state where neither the master 12 nor the slave 13 drives the data signal line 14-1, the error detection unit 22 can detect whether or not the data is correct.

The acknowledge signal detection unit 23 detects an acknowledge signal (ACK) or negative acknowledge signal (NACK) transmitted from the slave 13 that received the signal transmitted from the transmission and receiving unit 21 to check whether or not the slave 13 has successfully received a command, data, or the like. For example, it is specified in the bus IF 11 that if the slave 13 successfully receives a command, data, or the like without the occurrence of an error in the signal, the slave 13 transmits an ACK to the master 12. Moreover, it is specified in the bus IF 11 that if an error occurs in the signal and the slave 13 fails to receive a command, data, or the like, the slave 13 transmits a NACK to the master 12.

Therefore, the acknowledge signal detection unit 23 can confirm that the slave 13 has successfully received a command, data, or the like transmitted from the master 12 if having detected an ACK transmitted from the slave 13 for the command, data, or the like. On the other hand, the acknowledge signal detection unit 23 can confirm that the slave 13 has failed to receive a command, data, or the like transmitted from the master 12 if having detected a NACK transmitted from the slave 13 for the command, data, or the like.

If, for example, the acknowledge signal detection unit 23 has detected a NACK, the conflict avoidance unit 24 instructs the transmission and receiving unit 21 to transmit an abort signal that instructs the interruption of communication at some midpoint after ignoring a predetermined number of bits subsequent to the NACK, as described below with reference to FIG. 5. Consequently, the conflict avoidance unit 24 can avoid the occurrence of a conflict with, for example, read data transmitted from the slave 13 and an HDR exit command transmitted from the master 12.

Moreover, when, for example, the occurrence of an error has been detected using a token and CRC5, the conflict avoidance unit 24 presumes that the error is occurring in a preamble, and instructs the transmission and receiving unit 21 to transmit an abort signal after transmitting an additional clock of a predetermined number of bits, as described below with reference to FIG. 7. Consequently, the conflict avoidance unit 24 can avoid the occurrence of a conflict with, for example, read data transmitted from the slave 13 and an HDR exit command transmitted from the master 12.

The slave 13 is configured to include a transmission and receiving unit 31 and an error detection unit 32.

The transmission and receiving unit 31 transmits and receives signals to and from the master 12 via the data signal line 14-1 and the clock signal line 14-2. For example, the master 12 drives the data signal line 14-1 in synchronization with the timing of the serial clock of the clock signal line 14-2. Accordingly, the transmission and receiving unit 31 receives a signal transmitted from the master 12. Moreover, the transmission and receiving unit 31 drives the data signal line 14-1 in synchronization with the timing of the serial clock of the clock signal line 14-2, and accordingly transmits a signal to the master 12.

The error detection unit 32 detects an error occurring in a signal received by the transmission and receiving unit 31 as in the error detection unit 22 of the master 12. In addition, when an error is not occurring in the signal received by the transmission and receiving unit 31, the error detection unit 32 causes the transmission and receiving unit 31 to transmit, to the master 12, an ACK that signifies successful receipt of a command, data, or the like transmitted by the signal. On the other hand, when an error is occurring in the signal received by the transmission and receiving unit 31, the error detection unit 32 causes the transmission and receiving unit 31 to transmit, to the master 12, a NACK that signifies a failure in receipt of a command, data, or the like transmitted by the signal.

Furthermore, if, for example, it may be impossible to perform normal communication due to the occurrence of the error in the signal received by the transmission and receiving unit 31, the error detection unit 32 ignores any subsequent communications, stops responding to the master 12, and puts the slave 13 in a standby state.

The bus IF 11 is configured as described above. The master 12 and the slave 13 can transmit and receive signals via the data signal line 14-1 and the clock signal line 14-2. In addition, in the bus IF 11, the conflict avoidance unit 24 allows the master 12 to avoid the occurrence of a conflict.

Here, it is specified in the bus IF 11 to, for example, designate the type of data that is transmitted next, using a two-bit signal called a preamble, in DDR mode, as illustrated in FIG. 2. Incidentally, the preamble does not have a measure for error detection with parity or a CRC. Accordingly, when an error occurs in the preamble, it may be impossible to detect the error.

Moreover, the preamble is defined such that the master 12 typically drives the second bit of a preamble subsequent to read data in the bus IF 11. Consequently, it is possible in the bus IF 11 to avoid the second bit conflicting and ensure communication more reliably.

<First Definition Examples of Preambles>

FIG. 2 illustrates first definition examples of preambles in the bus IF 11. As described below, the preamble includes a two-bit signal with the first bit (pre[1]) and the second bit [pre[0]].

The first and second bits of a preamble immediately after the start of the HDR mode are driven by the master 12 and received by the slave 13.

Then, when the first bit of the preamble immediately after the start of the HDR mode is 0, then a command word is designated for transmission subsequent to the preamble. Incidentally, semantics of when the first bit is 1 is reserved. Moreover, when the second bit of the preamble immediately after the start of the HDR mode is 1, a command word is designated for transmission subsequent to the preamble. Moreover, semantics of when the second bit is 0 is reserved.

The first bit of a preamble immediately after a read command is driven by the master 12 and received by the slave 13. Moreover, the second bit of the preamble immediately after the read command is driven by the slave 13 and received by the master 12.

In addition, when the first bit of the preamble immediately after the read command is 1, data is designated for transmission subsequent to the preamble. Incidentally, semantics of when the first bit is 0 is reserved. Moreover, when the second bit of the preamble immediately after the read command is 0, it indicates an ACK signifying that the slave 13 has successfully received the read command. When the second bit is 1, it indicates a NACK signifying that the slave 13 has failed to receive the read command.

Here, it is necessary for the second bit of the preamble immediately after the read command that the master 12 keep the data signal line 14-1 at H level (high keeper: weak pull up). Consequently, if driven by neither the master 12 nor the slave 13, a bit for which the data signal line 14-1 stays at H level is 1 only when the previous bit is 1.

The first bit of a preamble immediately after read data is driven by the slave 13 and received by the master 12. Moreover, the second bit of the preamble immediately after the read data is typically driven by the master 12 and received by the slave 13, and also its use by the slave 13 is inhibited.

In addition, it is designated that when the first bit of the preamble immediately after the read data is 0, a CRC word is transmitted subsequent to the preamble, and when the first bit is 1, data is transmitted subsequent to the preamble. Moreover, when the second bit of the preamble immediately after the read data is 0, it indicates that the master 12 interrupts communication at some midpoint (Master aborts). When the second bit is 1, it indicates that the master 12 does not interrupt communication at some midpoint (Master doesn't abort). Here the master 12 keeps the data signal line 14-1 at H level for the second bit of the preamble immediately after the read data. However, this is not always necessary, and is for the purpose of avoiding indefinition.

The first and second bits of a preamble immediately after a write command are driven by the master 12 and received by the slave 13.

In addition, when the first bit of the preamble immediately after the write command is 1, data is designated for transmission subsequent to the write command. Incidentally, semantics of when the first bit is 0 is reserved. Moreover, when the second bit of the preamble immediately after the write command is 0, data is designated for transmission subsequent to the write command. Incidentally, semantics of when the first bit is 1 is reserved.

The first and second bits of a preamble immediately after write data are driven by the master 12 and received by the slave 13.

In addition, it is designated that when the first bit of the preamble immediately after the write data is 0, a CRC word is transmitted subsequent to the preamble, and when the first bit is 1, data is transmitted subsequent to the preamble. Moreover, when the second bit of the preamble immediately after the write data is 1, a CRC word or data is designated for transmission. Incidentally, semantics of when the second bit is 0 is reserved.

The preambles are defined in the bus IF 11 in this manner. In addition, for example, the second bit of the preamble immediately after the read data is defined to be typically driven by the master 12. Accordingly, the occurrence of a conflict can be avoided.

Suppose, for example, that it is specified that when a CRC word is transmitted, the slave 13 drives the second bit of the preamble immediately after the read data, otherwise the master 12 drives the second bit. In this case, it is assumed that an error occurs in the preamble upon transmission of the read data, when the slave 13 attempts to transmit the CRC word, the master 12 misrecognizes it as the read data; accordingly, the second bit conflicts. In other words, in this case, the subject that drives the second bit is different if, for example, the master 12 misrecognizes the first bit of the preamble. Accordingly, signals may collide in the bus IF 11. Furthermore, in this case, it is assumed that if the slave 13 transmits a CRC words, the master 12 is not capable of outputting an abort signal.

In contrast, it is specified that, in the bus IF 11, the master 12 typically drives the second bit of the preamble transmitted subsequent to the read data. Consequently, for example, the master 12 does not output the next clock when outputting an abort signal. Accordingly, the slave 13 enters a state of being incapable of driving. A conflict does not occur in the bus IF 11. Furthermore, as described above, if the slave 13 transmits a CRC word, the master 12 is also avoided being incapable of outputting an abort signal. Even if the slave 13 transmits a CRC word, the master 12 can output an abort signal.

In this manner, in the bus IF 11, the master 12 receives read data read out from the slave 13, and typically drives the second bit of the preamble transmitted/received subsequent to the read data. Accordingly, it is possible to avoid the second bit conflicting and ensure communication more reliably.

FIG. 3 illustrates modifications of the first definition examples of the preambles in the bus IF 11.

In the preambles illustrated in FIG. 3, the second bit of the preamble transmitted subsequent to the write data is different from the one in FIG. 2. Incidentally, other than that, the preambles are the same as those of FIG. 2, and their detailed description is omitted.

In other words, as illustrated in FIG. 3, when the second bit of the preamble transmitted after the write data is 0, data is designated for transmission subsequent to the preamble. Moreover, when the second bit of the preamble transmitted subsequent to the write data is 1, a CRC word is designated for transmission subsequent to the preamble. In other words, in this example, the first and second bits of the preamble transmitted subsequent to the write data are defined to invert their values. For example, it is defined that when the first and second bits of the preamble are 0 and 1, respectively, a CRC word is transmitted, and when the first and second bits of the preamble are 1 and 0, respectively, write data is transmitted.

Moreover, as another example, for example, when a CRC word is transmitted, 0 may be transmitted to the first and second bits of the preamble, and when data is transmitted, 1 may be transmitted to the first and second bits of the preamble. In other words, the master 12 transmits the same value twice in a row without inverting the values of the first and second bits of the preamble; accordingly, a one-bit error occurring in the preamble can be detected. However, in this case, it is more desirable that the values of the first and second bits of the preamble be inverted as illustrated in FIG. 3 than it becomes difficult to distinguish it from a state where neither the master 12 nor the slave 13 drives the data signal line 14-1.

In this manner, in the bus IF 11, the second bit of the preamble transmitted subsequent to write data is defined. Accordingly, the slave 13 can easily detect that, for example, a one-bit error has occurred in the preamble.

<Description of Communication in HDR Mode>

FIG. 4 illustrates a timing chart at the time of a read transfer.

Incidentally, in the following drawings, portions that are hatched in gray represent being driven by the slave 13. Moreover, portions hatched in thin oblique lines represent being driven by the slave 13 and the master 12 keeping the data signal line 14-1 at H level. Portions hatched in thick oblique lines represent no driving.

As illustrated in FIG. 4, firstly, the master 12 transmits a broadcast command (0x7E+R/W=0) that notifies that a command is transmitted to all the slaves 13 forming the bus IF 11 at the same time, in SDR mode. The master 12 then receives ACKs transmitted from the slaves 13 to confirm successful receipt of the broadcast command and transmits a common command code (ENTHDR CCC (0x20)) that the master 12 enters the HDR mode. In this manner, the master 12 notifies the slaves 13 that the master 12 enters the HDR mode and transits to the HDR mode.

The first and second bits of a preamble immediately after the transit to the HDR mode are then driven by the master 12. In the example of FIG. 4, it is specified that a command word (DDR command) is transmitted subsequent to the preamble (pre[1]: 0, pre[0]: 1). The master 12 then transmits the command word (Command Code, Slave address, Reserved, Parity) subsequent to the preamble.

Furthermore, in terms of a preamble immediately after the transmission of the command word, the first bit is driven by the master 12, and the second bit is driven by the slave 13. In the example of FIG. 4, the first bit specifies that data (DDR Data) is transmitted subsequent to the preamble (pre[1]: 1), and also the second bit indicates that the slave 13 has successfully received the command [pre[0]: 0]. The slave 13 then transmits read data (Data bit, Parity) subsequent to the preamble.

Next, in terms of a preamble immediately after the transmission of the read data, the first bit is driven by the slave 13, and the second bit is driven by the master 12. In the example of FIG. 4, the first bit specifies the transmission of data (DDR Data) subsequent to the preamble) (pre[1]: 1). Moreover, the second bit causes the master 12 to transmit an abort signal (pre[1]: 0) or a non-abort signal (pre[1]: 1) regardless of which of read data and a CRC the data to be read out next is. If the master 12 transmits an abort signal, the communication is interrupted. If the master 12 transmits a non-abort signal, the communication is continued. The second bit is typically driven by the master 12 as described above.

In addition, if the communication is continued, from that point onward, read data is similarly and repeatedly transmitted, and the slave 13 transmits all data requested by the master 12.

The first bit of a preamble immediately after the transmission of the last read data then specifies the transmission of a CRC word (DDR CRC) subsequent to the preamble (pre[1]: 0). Incidentally, the second bit of the preamble immediately before the transmission of the CRC word is inhibited to be driven by the slave 13.

In addition, after the slave 13 transmits the CRC word (Token (0xC), CRC5) subsequent to the preamble, the master 12 transmits an HDR exit command (HDR Exit) to end the communication in HDR mode. Incidentally, the first bit (setup) of the HDR exit command is output by the master 12. Moreover, as illustrated, the driving of the data signal line 14-1 is switched from the slave 13 to the master 12 after the bit immediately after the receipt of the CRC word; accordingly, the communication can be ended safely and quickly.

In this manner, a read transfer is performed in HDR mode in the bus IF 11. In addition, the master 12 typically drives the second bit of a preamble immediately after read data in the bus IF 11; accordingly, it is possible to avoid the second bit conflicting. Consequently, communication can be ensured more reliably in the bus IF 11.

<Description of a Preamble Error>

A description is given of an error occurring in a preamble and a process of when the error occurs in the preamble with reference to FIGS. 5 to 10.

Figure 5:
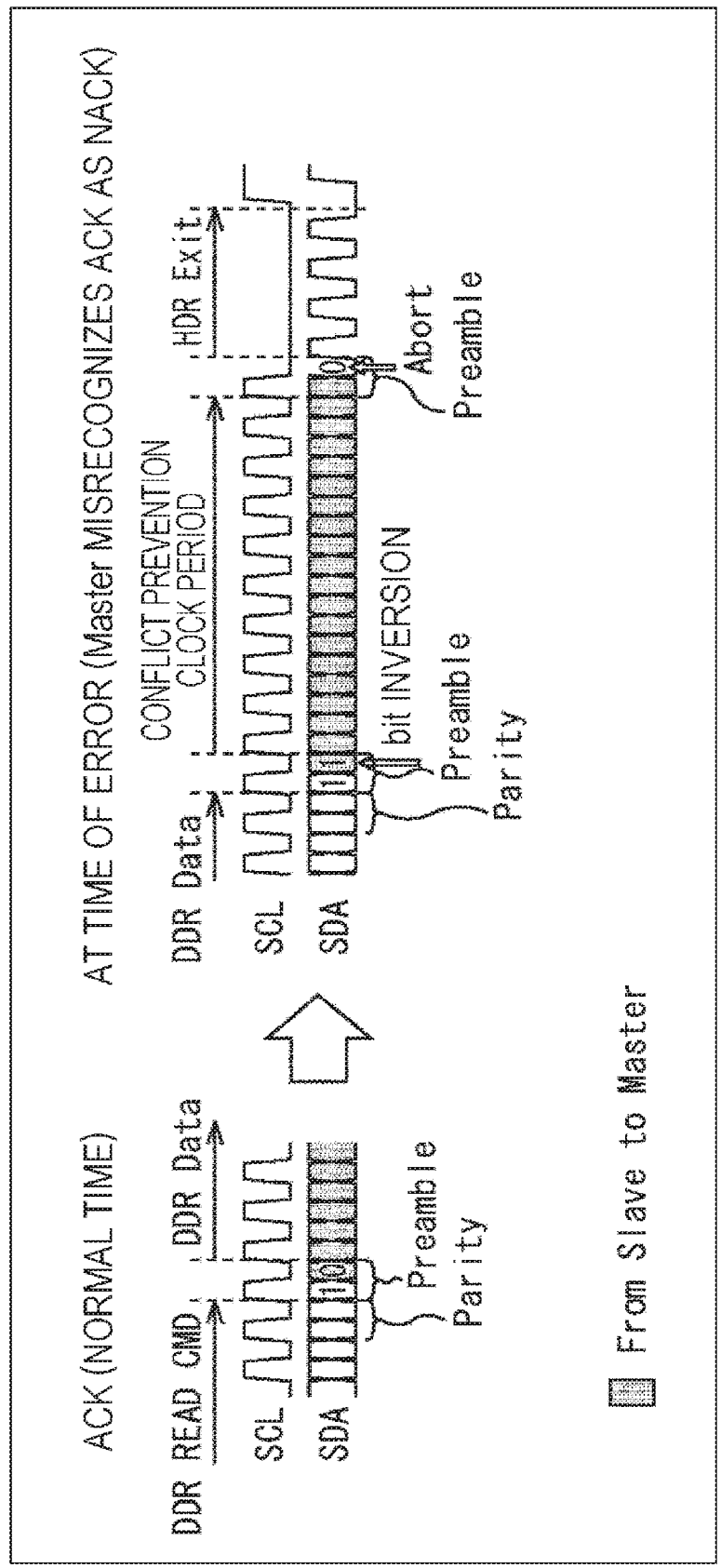
FIG. 5 is a diagram illustrating an example where a one-bit error occurs in an ACK in a preamble immediately after a read command.
Figure 6:
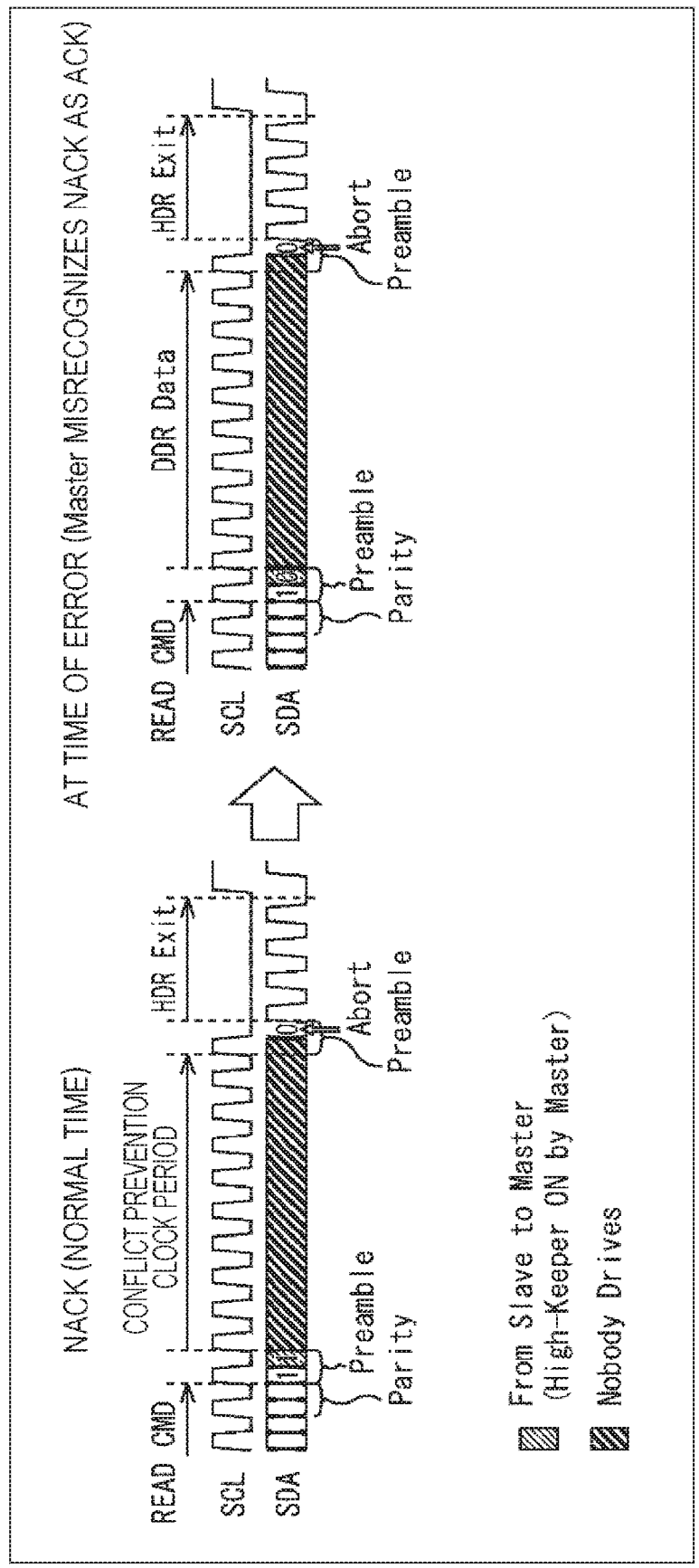
FIG. 6 is a diagram illustrating an example where a one-bit error occurs in a NACK in the preamble immediately after the read command.

With reference to FIGS. 5 and 6, a description is given of an example where a one-bit error where the value of a bit is inverted occurs in the second bit of a preamble of when read data is transmitted subsequent to a read command. As described above, the second bit of the preamble immediately after the read command signifies an ACK or NACK transmitted from the slave 13 to the master 12.

FIG. 5 illustrates an example where a one-bit error occurs in an ACK transmitted from the slave 13 in the preamble immediately after the read command.

As illustrated in the left side of FIG. 5, at the normal time, the slave 13 drives the second bit of the preamble to 0 so that the master 12 recognizes that an ACK has been transmitted. In this case, the master 12 performs the process of receiving the read data transmitted from the slave 13 subsequent to the preamble, in response to the detection of the ACK.

In contrast, as illustrated in the right side of FIG. 5, at the time of an error, the second bit of the preamble is bit-inverted to 1. Accordingly, the master 12 results in misrecognizing that a NACK has been transmitted. In this case, the master 12 is not capable of detecting the error that has occurred in the preamble but can end the communication by performing a normal process for a case where a NACK is detected. In other words, the master 12 drives, to 0, the second bit of a preamble after a lapse of a conflict prevention clock period corresponding to the number of bits of the read data transmitted from the slave 13, and transmits an abort signal to the slave 13.

In this manner, the master 12 can notify the slave 13 successfully about the interruption of the communication even if misrecognizing an ACK as a NACK. Accordingly, the occurrence of a conflict based on the misrecognition is avoided. The master 12 then transmits an HDR exit command to end the communication in HDR mode.

FIG. 6 illustrates an example where a one-bit error occurs in a NACK transmitted from the slave 13 in the preamble immediately after the read command.

As illustrated in the left side of FIG. 6, at the normal time, the slave 13 drives the second bit of the preamble to 1 so that the master 12 recognizes that a NACK has been transmitted. In this case, the master 12 drives, to 0, the second bit of the preamble after a lapse of the conflict prevention clock period corresponding to the number of bits of the read data, in response to the detection of the NACK, and transmits an abort signal to the slave 13. The master 12 then transmits an HDR exit command to end the communication in HDR mode.

In contrast, as illustrated in the right side of FIG. 6, at the time of an error, the second bit of the preamble is bit-inverted to 0. Accordingly, the master 12 results in misrecognizing that an ACK has been transmitted. In this case, the master 12 performs the process of receiving the read data transmitted from the slave 13. However, the slave 13 has failed to receive the read command and therefore does not transmit the read data. Hence, during this period, neither the master 12 nor the slave 13 drives the data signal line 14-1.

At this point in time, the master 12 performs a parity check or the like on a signal that is received in the period during which the master 12 misrecognizes that the read data is transmitted and accordingly can detect an error, in other words, can detect that the read data has not successfully been transmitted. For example, parity included in the read data is defined that the occurrence of an error can be detected when the data signal line 14-1 is not driven in the period during which the master 12 misrecognizes that the read data is transmitted.

In accordance with the detection of the error, the master 12 drives, to 0, the second bit of a preamble immediately after the period during which the master 12 misrecognizes that the read data is transmitted and transmits an abort signal to the slave 13. The master 12 then transmits an HDR exit command to end the communication in HDR mode.

Figure 7:
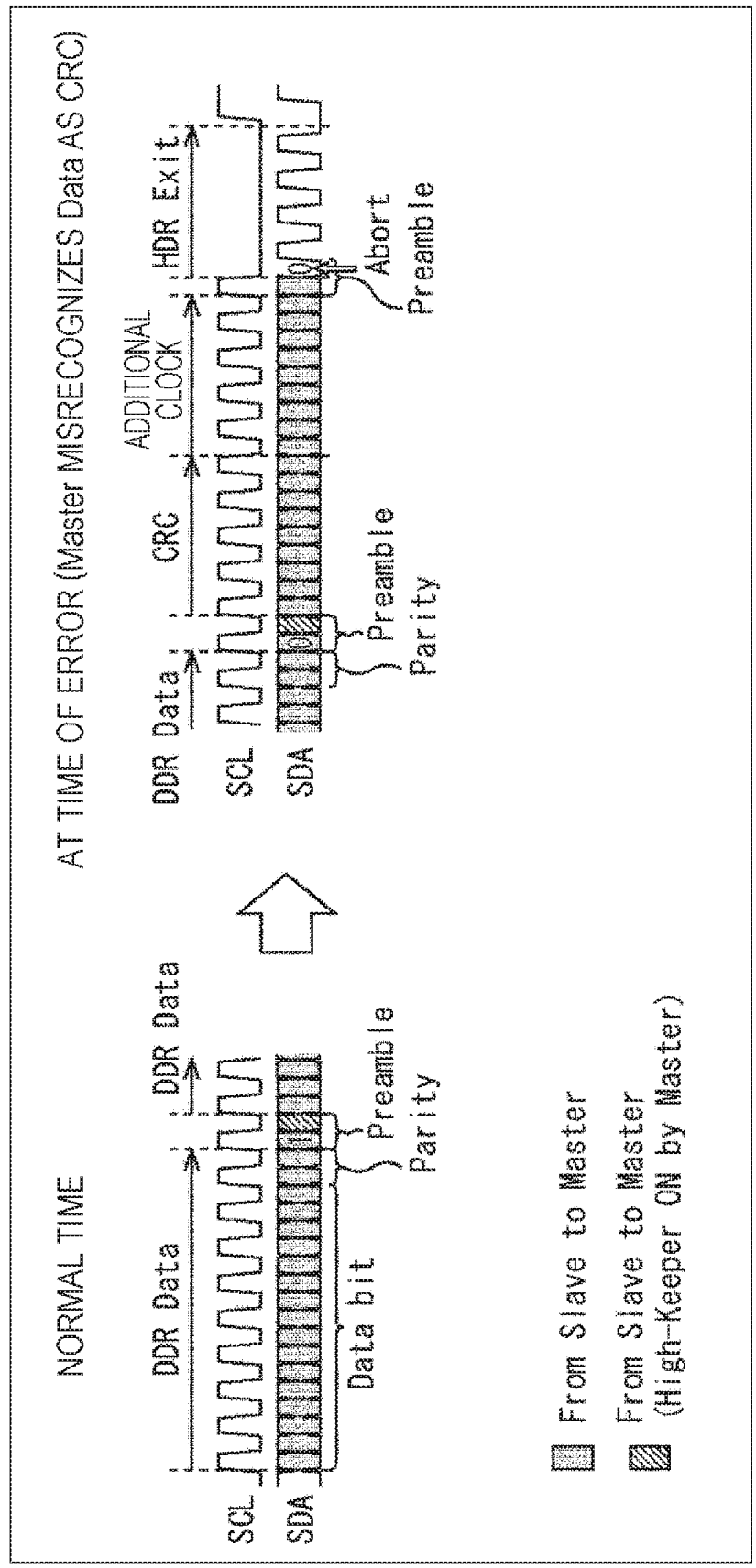
FIG. 7 is a diagram illustrating a first example where a one-bit error occurs in the first bit of a preamble immediately after read data when the first bit is 1.
Figure 8:
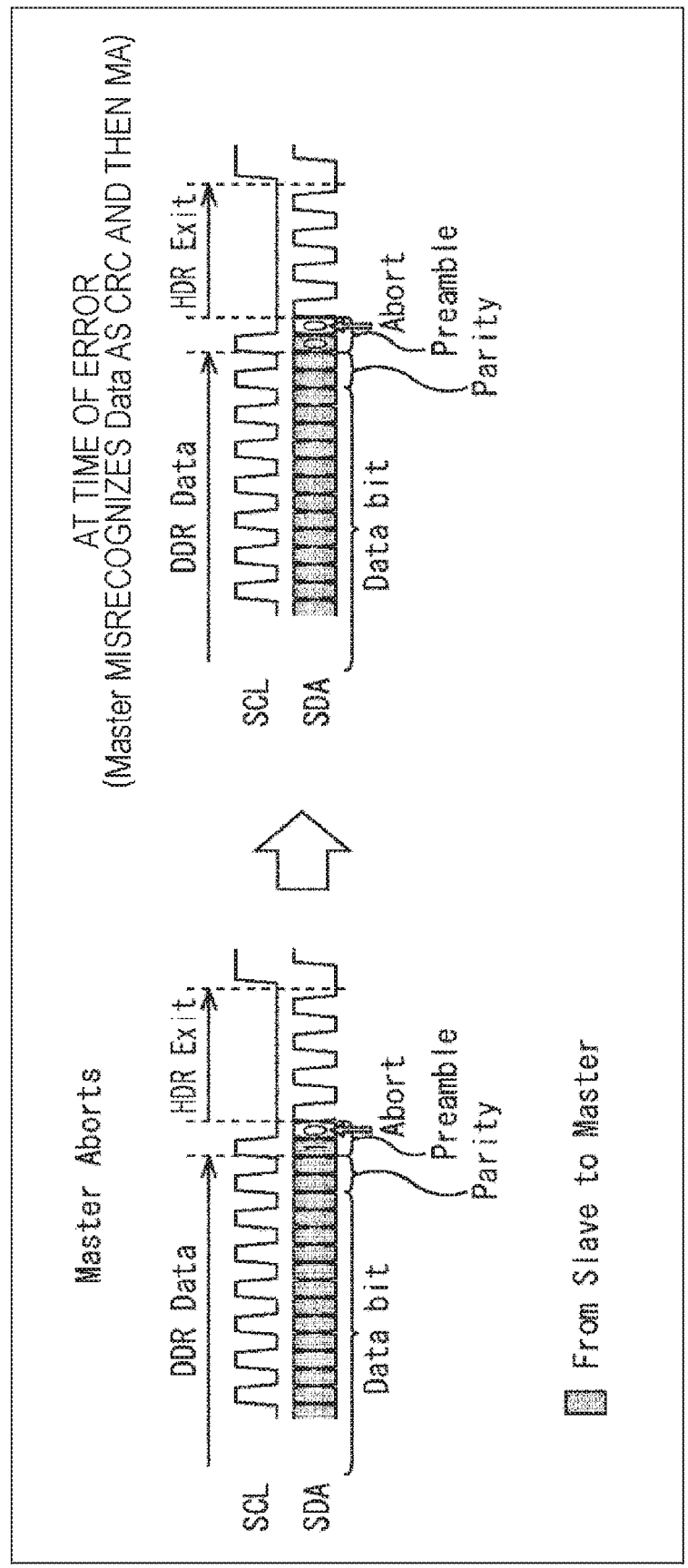
FIG. 8 is a diagram illustrating a second example where a one-bit error occurs in the first bit of the preamble immediately after the read data when the first bit is 1.

Next, a description is given of an example where a one-bit error where the value of a bit is inverted occurs in the first bit of a preamble of when read data is transmitted subsequent to read data, with reference to FIGS. 7 and 8. As described above, the first bit of the preamble immediately after the read data is driven to 0 when a CRC word is transmitted subsequent to the preamble, and is driven to 1 when read data is transmitted subsequent to the preamble.

FIG. 7 illustrates a first example where when the first bit of the preamble immediately after the read data is 1, a one-bit error occurs in the first bit.

As illustrated in the left side of FIG. 7, at the normal time, the slave 13 drives the first bit of the preamble to 1 so that the master 12 recognizes that the read data is transmitted subsequent to the preamble. In this case, the master 12 performs the process of receiving the read data.

In contrast, as illustrated in the right side of FIG. 7, at the time of an error, the first bit of the preamble is bit-inverted to 0. Accordingly, the master 12 results in misrecognizing that a CRC word is transmitted subsequent to the preamble. In this case, the master 12 can detect the occurrence of the error on the basis of a token and CRC5 included in the CRC word, and presumes that the error is occurring in the preamble.

Therefore, in this case, the master 12 drives, to 0, the second bit of a preamble after the transmission of an additional clock (nine bits) of which number of bits corresponds to a difference between the number of bits (18 bits) of the read data and the number of bits (nine bits) of the CRC word. The master 12 transmits an abort signal to the slave 13. The master 12 then transmits an HDR exit command to end the communication in HDR mode.

FIG. 8 illustrates a second example where when the first bit of the preamble immediately after the read data is 1, a one-bit error occurs in the first bit.

As illustrated in the left side of FIG. 8, there is a case where the slave 13 attempts to transmit read data subsequent to the read data while the master 12 transmits an abort signal to interrupt the communication at some midpoint.

At this point in time, as illustrated in the right side of FIG. 8, when a one-bit error occurs in the first bit of the preamble immediately after the read data, the master 12 misrecognizes that read data is transmitted subsequent to the preamble. At this point in time, the master 12 transmits an abort signal at the second bit of the preamble. Accordingly, even if there is such misrecognition, the communication in HDR mode ends without occurrence of a problem.

Figure 9:
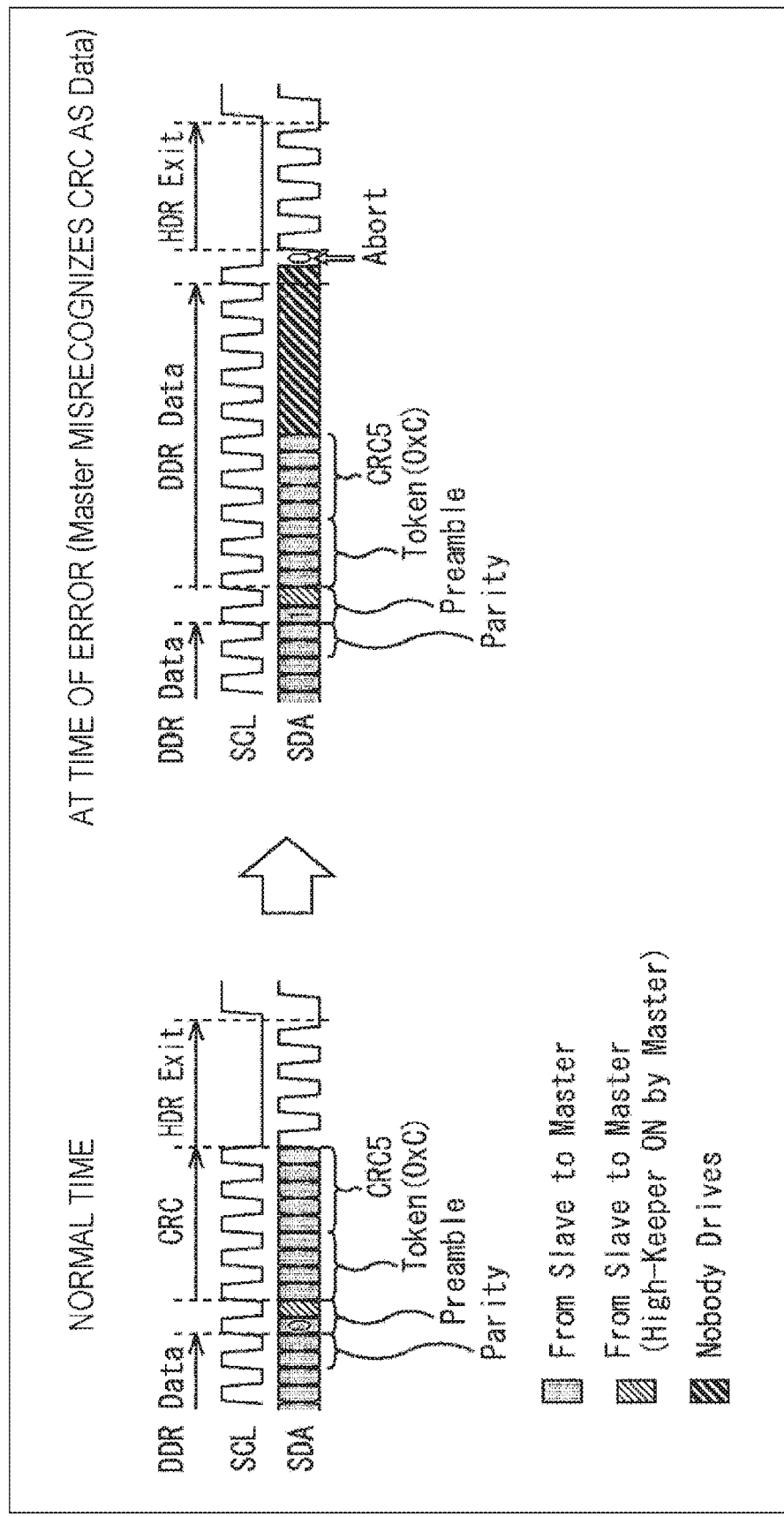
FIG. 9 is a diagram illustrating a first example where a one-bit error occurs in the first bit of the preamble immediately after the read data when the first bit is 0.
Figure 10:
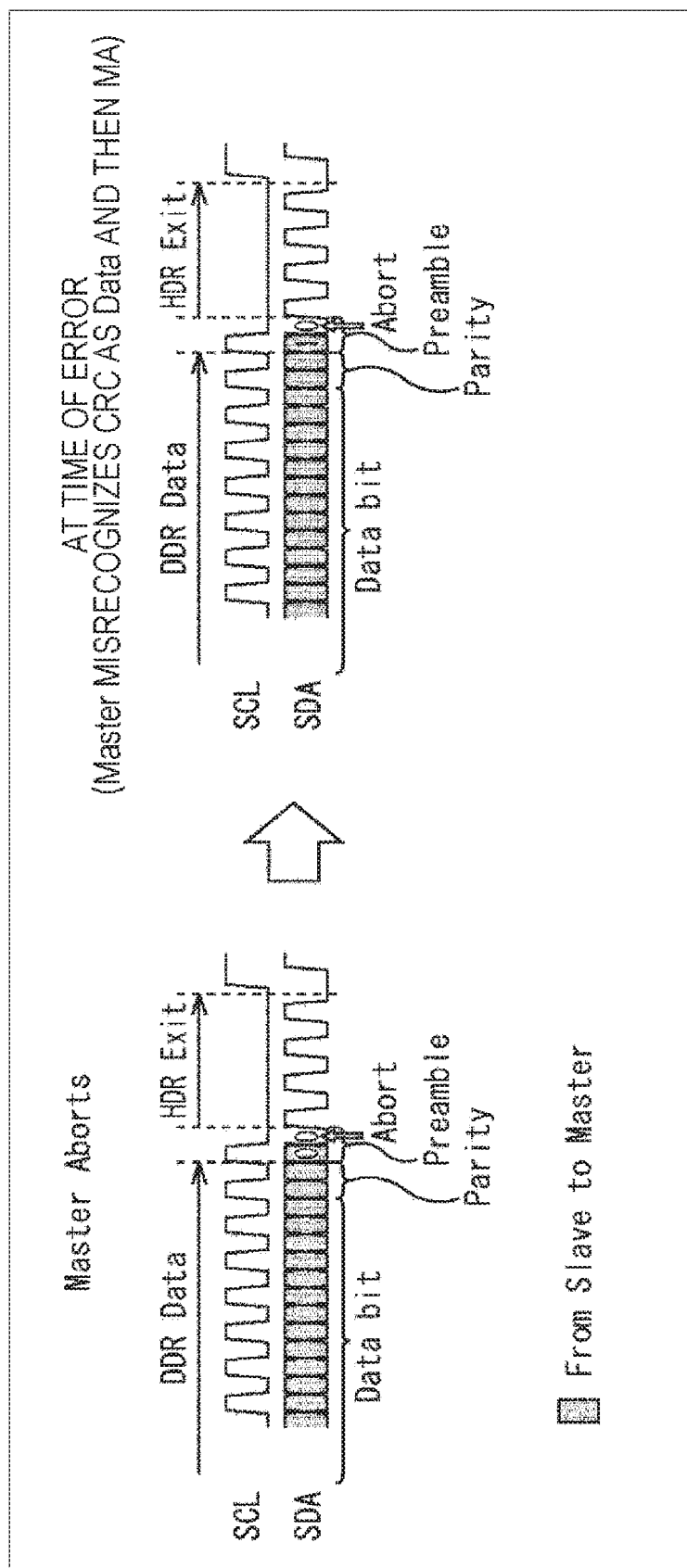
FIG. 10 is a diagram illustrating a second example where a one-bit error occurs in the first bit of the preamble immediately after the read data when the first bit is 0.

Next, with reference to FIGS. 9 and 10, a description is given of an example where when a one-bit error where the value of a bit is inverted occurs in the first bit of a preamble of when a CRC word is transmitted subsequent to read data. As described above, the first bit of the preamble immediately after the read data is driven to 0 when a CRC word is transmitted subsequent to the preamble, and is driven to 1 when read data is transmitted subsequent to the preamble.

FIG. 9 illustrates a first example where when the first bit of the preamble immediately after the read data is 0, a one-bit error occurs in the first bit.

As illustrated in the left side of FIG. 9, at the normal time, the slave 13 drives the first bit of the preamble to 0 so that the master 12 recognizes that a CRC word is transmitted subsequent to the preamble. In this case, the master 12 performs the process of receiving the CRC word and then transmits an HDR exit command.

In contrast, as illustrated in the right side of FIG. 9, at the time of an error, the first bit of the preamble is bit-inverted to 1. Accordingly, the master 12 results in misrecognizing that read data is transmitted subsequent to the preamble. In this case, a period after a token and a CRC are received within a period during which the master 12 misrecognizes that read data is transmitted, the data signal line 14-1 is not driven. Therefore, the master 12 performs a parity check on a signal that is received in the period during which the master 12 misrecognizes that read data is transmitted and accordingly can detect an error, in other words, can detect that read data has not successfully been transmitted.

In accordance with the detection of the error, the master 12 drives, to 0, the second bit of a preamble immediately after the period during which the master 12 misrecognizes that read data is transmitted, and transmits an abort signal to the slave 13. The master 12 then transmits an HDR exit command to end the communication in HDR mode.

FIG. 10 illustrates a second example of where when the first bit of the preamble immediately after the read data is 0, a one-bit error occurs in the first bit.

As illustrated in the left side of FIG. 10, there is a case where the slave 13 attempts to transmit a CRC word subsequent to the read data while the master 12 transmits an abort signal to interrupt the communication at some midpoint.

At this point in time, as illustrated in the right side of FIG. 10, when a one-bit error occurs in the first bit of the preamble immediately after the read data, the master 12 misrecognizes that read data is transmitted subsequent to the preamble. At this point in time, the master 12 transmits an abort signal at the second bit of the preamble. Accordingly, even if there is such misrecognition, the communication in HDR mode ends without occurrence of a problem.

As described above, even if the preamble does not have a measure for error detection in the bus IF 11, it is possible to cause the master 12 to avoid deadlock in the bus IF 11 and ensure communication more reliably.

<A Communication Method for Avoiding Occurrence of Conflicts>

Figure 11:
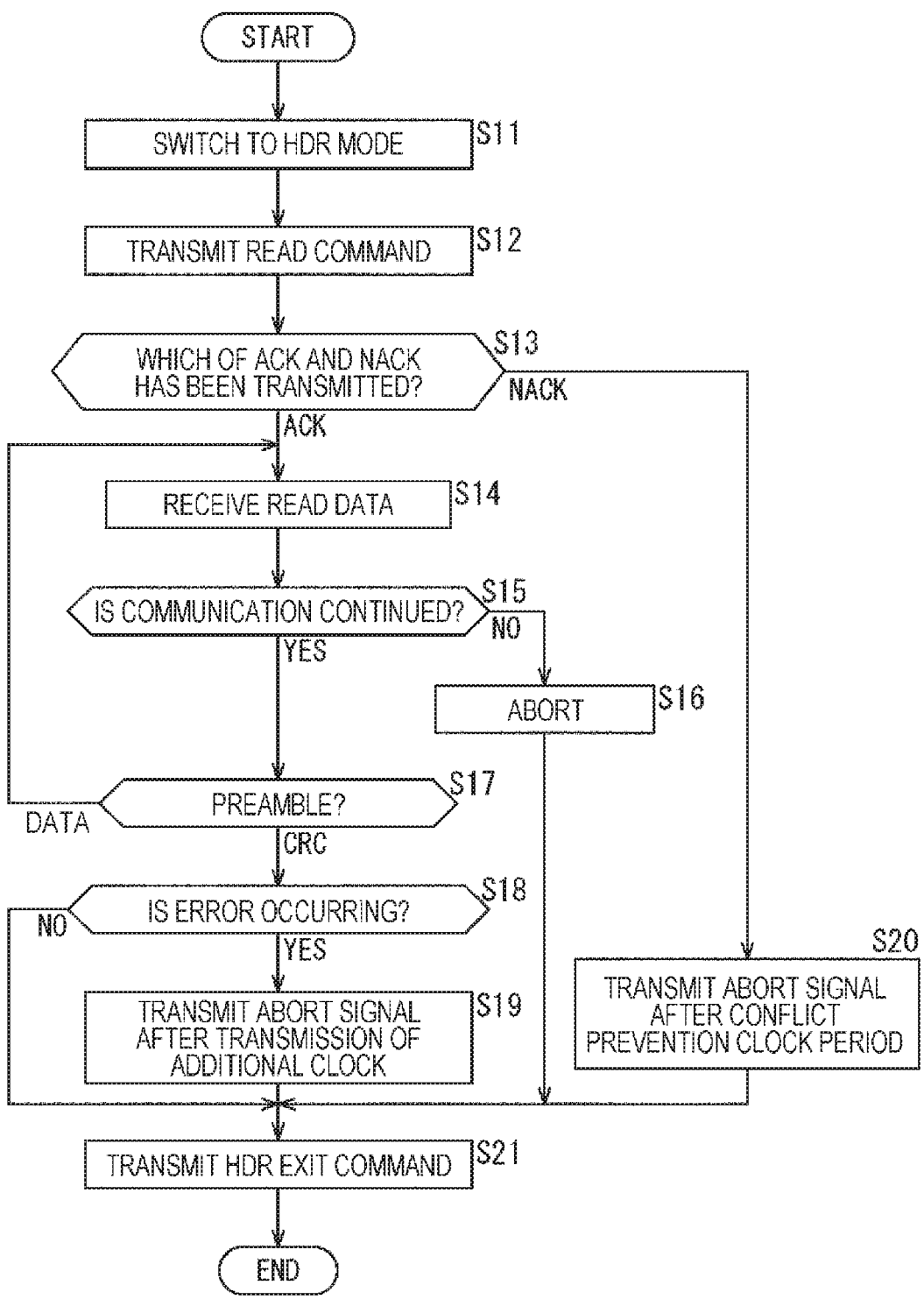
FIG. 11 is a flowchart describing a communication process of a master in DDR mode.

FIG. 11 is a flowchart describing the master 12's communication process of reading data from the slave 13 in DDR mode being one of the HDR mode (DDR Read).

In step S11, the master 12 performs the process of switching communication from the SDR mode to the HDR mode. Specifically, in the master 12, the transmission and receiving unit 21 drives the data signal line 14-1 and the clock signal line 14-2, and transmits the broadcast command (0x7E+R/W=0) that notifies that a command is transmitted to all the slaves 13 forming the bus IF 11 at the same time, in SDR mode. When the acknowledge signal detection unit 23 in the master 12 has subsequently received ACKs transmitted from the slaves 13 to confirm successful receipt of the broadcast command, the transmission and receiving unit 21 transmits the common command code (ENTHDR CCC (0x20)) to enter the HDR mode.

In step S12, the transmission and receiving unit 21 of the master 12 drives the data signal line 14-1 and the clock signal line 14-2 to transmit a read command.

In step S13, the acknowledge signal detection unit 23 detects the value of the second bit of a preamble after the transmission of the read command, and determines which of an ACK and a NACK the slave 13 has transmitted. In other words, the acknowledge signal detection unit 23 determines that the slave 13 has transmitted an ACK if having detected that the second bit of the preamble after the transmission of the read command is 0. On the other hand, the acknowledge signal detection unit 23 determines that the slave 13 has transmitted a NACK if having detected that the second bit of the preamble after the transmission of the read command is 1.

If the acknowledge signal detection unit 23 has determined in step S13 that the slave 13 transmitted an ACK, the processing proceeds to step S14. The transmission and receiving unit 21 receives read data that is transmitted subsequent to the preamble. Furthermore, the transmission and receiving unit 21 receives the first bit of a preamble that is transmitted subsequent to the read data.

In step S15, the master 12 determines whether or not to continue the communication. For example, if having judged that the next read data or CRC word is unnecessary, the master 12 can determine not to continue the communication.

If the master 12 has determined in step S15 not to continue the communication, the processing proceeds to step S16. The transmission and receiving unit 21 transmits an abort signal (pre[0]: 0) that instructs the interruption of the communication at some midpoint at the second bit of the preamble. The processing then proceeds to step S21. The transmission and receiving unit 21 transmits an HDR exit command subsequent to the abort signal. On the other hand, if the master 12 has determined in step S15 to continue the communication, the transmission and receiving unit 21 transmits a non-abort signal (pre[0]: 1) that instructs not to interrupt the communication at some midpoint at the second bit of the preamble. The processing then proceeds to step S17.

In step S17, the transmission and receiving unit 21 determines which of read data and a CRC word is designated for transmission, on the basis of the first bit of the preamble received in step S14.

If the transmission and receiving unit 21 has determined in step S17 that the preamble designates read data for transmission, the processing returns to step S14. Similar processing is repeated from this point onward. On the other hand, if the transmission and receiving unit 21 has determined in step S17 that the preamble designates a CRC word for transmission, the processing proceeds to step S18.

In step S18, the transmission and receiving unit 21 receives a signal transmitted subsequent to the preamble received in step S13. The error detection unit 22 determines whether or not an error is occurring in the signal.

If the error detection unit 22 has determined in step S18 that an error is occurring in the signal transmitted subsequent to the preamble that designates a CRC word for transmission, the processing proceeds to step S19. In other words, in this case, if the error detection unit 22 has detected a token error or CRC error, the conflict avoidance unit 24 presumes that an error has occurred in the preamble.

In step S19, the error detection unit 22 transmits such an additional clock as described with reference to FIG. 7, and then instructs the transmission and receiving unit 21 to transmit an abort signal that instructs the interruption of the communication at some midpoint. At this instruction, the transmission and receiving unit 21 transmits the additional clock and then transmits an abort signal to the slave 13. The processing subsequently proceeds to step S21. The transmission and receiving unit 21 transmits an HDR exit command subsequent to the abort signal.

On the other hand, also if the error detection unit 22 has not determined in step S18 that an error is occurring in the signal transmitted subsequent to the preamble that designates a CRC word for transmission, the transmission and receiving unit 21 transmits an HDR exit command in step S21.

On the other hand, if the acknowledge signal detection unit 23 has determined in step S13 that the slave 13 transmitted a NACK, the processing proceeds to step S20. In step S20, the conflict avoidance unit 24 instructs the transmission and receiving unit 21 to transmit an abort signal that instructs the interruption of the communication at some midpoint after a lapse of the conflict prevention clock period corresponding to the number of bits of the read data. At this instruction, the transmission and receiving unit 21 transmits an abort signal to the slave 13 as described above with reference to FIG. 6. The processing subsequently proceeds to step S21. The transmission and receiving unit 21 transmits an HDR exit command subsequent to the abort signal.

Consequently, the communication process where the master 12 reads out data from the slave 13 in DDR mode (DDR read) ends.

As described above, in the bus IF 11, the master 12 typically drives the second bit of a preamble immediately after read data. Accordingly, it is possible to avoid the second bit conflicting. Moreover, if the master 12 has determined to have received a NACK, even if the NACK is a one-bit error of an ACK, the occurrence of a conflict can be avoided in the bus IF 11. Furthermore, even if a one-bit error occurs in a preamble that designates a CRC word for transmission by the slave 13 in the bus IF 11, the master 12 can presume the occurrence of the error in the preamble with error detection based on the CRC word. Therefore, the occurrence of a conflict can be avoided.

Therefore, even if a preamble does not have a measure for error detection, it is possible in the bus IF 11 to avoid a conflict due to the occurrence of an error in the preamble and ensure communication more reliably.

<Second Definition Examples of Preambles>

FIG. 12 illustrates second definition examples of preambles in the bus IF 11.

Moreover, in the bus IF 11, a preparation bit (ppr) is defined to be transmitted one bit before a preamble to add redundancy to the preamble. FIG. 12 also illustrates definition examples of preparation bits.

The preparation bit is defined not to be transmitted one bit before a preamble immediately after the start of the HDR mode. Moreover, the preamble immediately after the start of the HDR mode is defined as in FIG. 2.

A preparation bit one bit before a preamble immediately after a read command is driven by the master 12, and received by the slave 13. In addition, when the preparation bit is 1, it designates data for transmission subsequent to the preamble. Incidentally, semantics of when the preparation bit is 0 is reserved.

Moreover, the first bit of the preamble immediately after the read command is driven by the slave 13, and received by the master 12. In addition, when the first bit is 0, it signifies an ACK that indicates that the slave 13 has successfully received the read command. When the first bit is 1, it signifies a NACK that indicates that the slave 13 has failed to receive the read command. Here, in terms of the first bit of the preamble immediately after the read command, it is necessary that the master 12 keep the data signal line 14-1 at H level. In other words, the first bit of the preamble immediately after the read command is defined to be the same as the second bit.

A preparation bit one bit before a preamble immediately after read data is driven by the slave 13, and received by the master 12. In addition, when the preparation bit is 0, it designates a CRC word for transmission subsequent to the read data. When the preparation bit is 1, it designates data for transmission subsequent to the read data. Incidentally, the preamble immediately after the read data is defined as in FIG. 2.

A preparation bit one bit before a preamble immediately after a write command is driven by the master 12, and received by the slave 13. In addition, when the preparation bit is 1, it designates data for transmission subsequent to the write command. Semantics of when the preparation bit is 0 is reserved. Incidentally, the preamble immediately after the write command is defined as in FIG. 2.

A preparation bit one bit before a preamble immediately after write data is driven by the master 12, and received by the slave 13. In addition, when the preparation bit is 0, it designates a CRC word for transmission subsequent to the write data. When the preparation bit is 1, it designates data for transmission subsequent to the write data. Incidentally, the preamble immediately after the write data is defined as in FIG. 2.

The use of such preparation bits as illustrated in FIG. 12 enables the detection of an error occurring in a preamble.

If, for example, an error occurs in a preamble and neither the master 12 nor the slave 13 drives the bus IF 11, the detection of a parity error is necessary. However, parity may be correct accidentally. Hence, in order to eliminate the possibility of such accidental agreement and, if an error occurs in a preamble, ensure that the master 12 performs a master abort, the parity is changed from two bits to one bit, and the one bit is used for the preparation bit. Accordingly, the error occurring in the preamble can be detected. Specifically, one bit is deleted from the parity of a command and data. Such preparation bits as illustrated in FIG. 12 are defined.

For example, as described above, the preparation bit after the read data and the one bit of the first bit of the preamble are used to explicitly specify which of read data and a CRC word is transmitted subsequent to the preamble. Consequently, a preamble error can be detected.

Moreover, the master 12 typically drives the second bit of the preamble subsequent to the read data so that the master 12 does not output the next clock at the time of a master abort. Accordingly, the slave 13 enters a state that driving is not allowed. Hence, the occurrence of a conflict can be avoided.

Moreover, the same bit is transmitted twice for the first and second bits of a preamble subsequent to a read command. Accordingly, an error occurring in an ACK or NACK can be detected. Consequently, it is also possible to avoid the occurrence of a section where neither the master 12 nor the slave 13 drives: accordingly, the master 12 can perform a master abort while accidental agreement of parity errors is avoided. The preparation bit of in this case is used to be pulled to 1 such that the H level is kept by the master 12.

<Description of Communication in HDR Mode>

Figure 13:
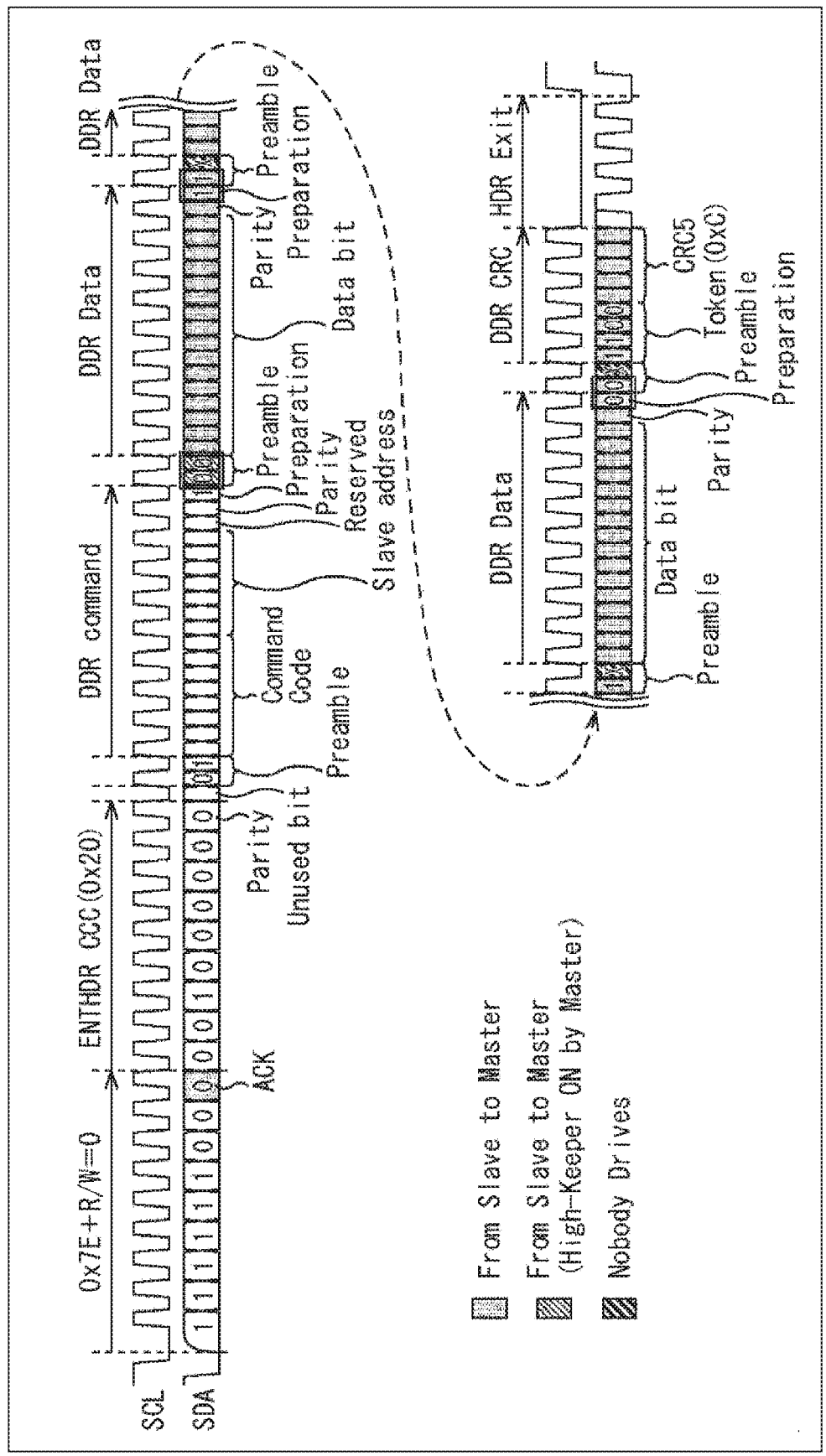
FIG. 13 is a diagram illustrating a timing chart at the time of the read transfer.

FIG. 13 illustrates a timing chart at the time of the read transfer. Here in FIG. 13, a description is given of points different from the timing chart illustrated in FIG. 4.

For example, the last two bits of the command word (DDR command) are parity in the timing chart of FIG. 4 whereas the first bit of the two bits is parity and the second bit is the preparation bit in the timing chart of FIG. 13. Similarly, the last two bits of the read data (DDR Data) are parity in the timing chart of FIG. 4 whereas the first bit of the two bits is parity and the second bit is the preparation bit in the timing chart of FIG. 13.

In this manner, if, for example, read data is transmitted subsequent to a read command, the same value is transmitted twice for a preamble subsequent to the read command. Moreover, if read data is transmitted subsequent to read data, the same value is transmitted twice for a preparation bit at the end of the read data and the first bit of the preamble subsequent to the read data. Furthermore, if a CRC word is transmitted subsequent to read data, the same value is transmitted twice for a preparation bit at the end of the read data and the first bit of a preamble subsequent to the read data.

In this manner, the use of a preparation bit enables the same bit to be transmitted twice in the bus IF 11. Redundancy can be encouraged to enable the detection of an error occurring in a preamble.

<Description of an Error in the Preparation Bit and the Preamble>

An error occurring in the preparation bit and the preamble is described with reference to FIGS. 14 to 16.

Figure 14:
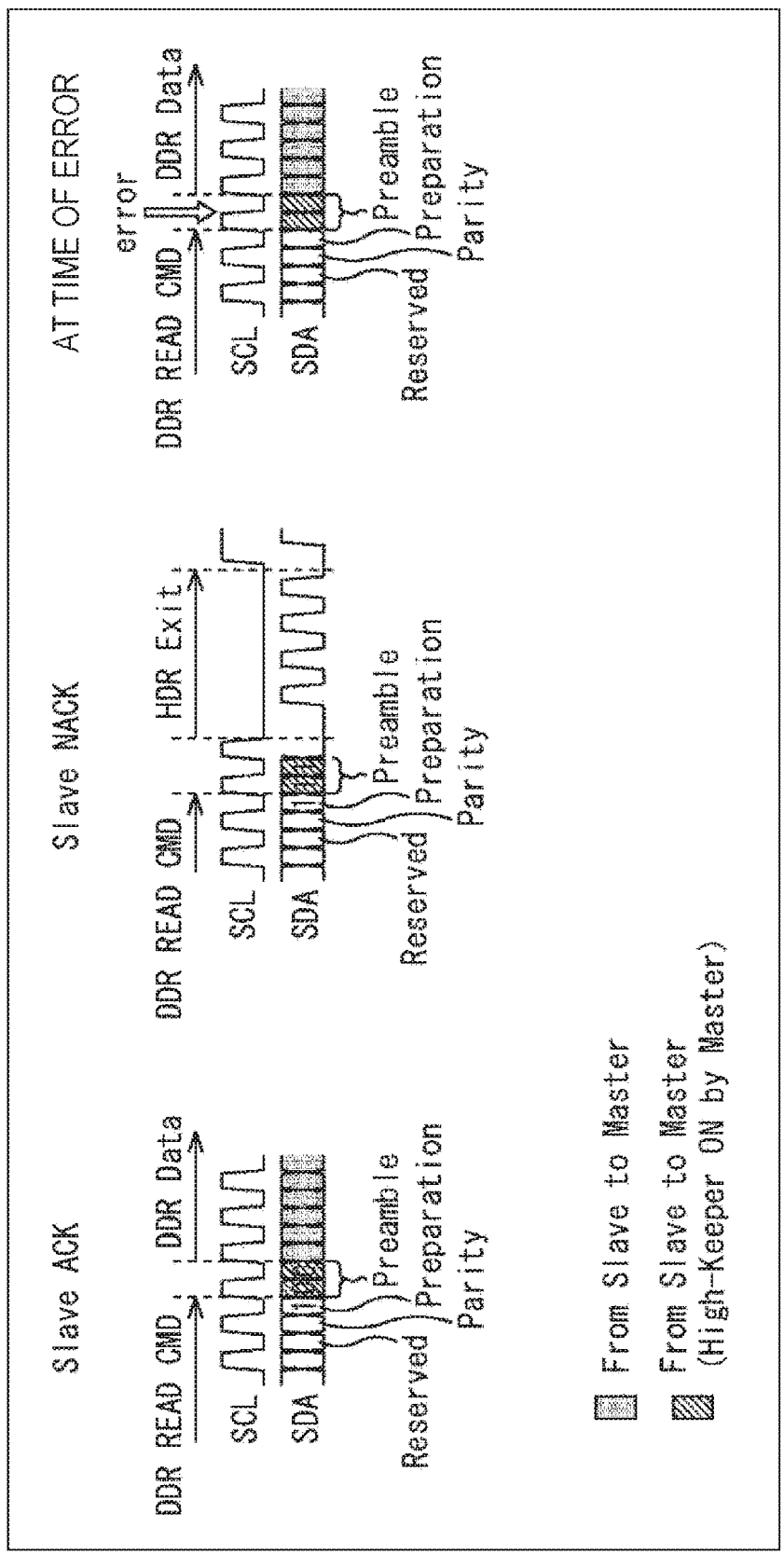
FIG. 14 is a diagram illustrating an example where a one-bit error occurs in a preparation bit and a preamble when read data is transmitted subsequent to a read command.

FIG. 14 illustrates an example where a one-bit error occurs in a preparation bit and a preamble when read data is transmitted subsequent to a read command. As described above, the second bit of the preamble immediately after the read command signifies an ACK or NACK transmitted from the slave 13 to the master 12.

As illustrated in the left side of FIG. 14, when the slave 13 transmits an ACK, the preparation bit is driven to 1, and the first and second bits of the preamble are driven to 0 (ppr: 1, pre[1]: 0, pre[0]: 0).

Moreover, as illustrated in the center of FIG. 14, when the slave 13 transmits a NACK, the preparation bit is driven to 1, and the first and second bits of the preamble are driven to 1 (ppr: 1, pre[1]: 1, pre[0]: 1). Incidentally, FIG. 14 illustrates an example where after the master 12 detects the NACK, a clock for the prevention of a collision equal to one bit is inserted, and then an HDR exit command (HDR Exit) is transmitted. Moreover, the master 12 may transmit the HDR exit command without inserting such a clock for the prevention of a collision, immediately after the detection of the NACK.

In this manner, the three-bit combination of the preparation bit and the preamble can take only (ppr: 1, pre[1]: 0, pre[0]: 0) or (ppr: 1, pre[1]: 1, pre[0]: 1). Accordingly, when an error occurs as illustrated in the right side of FIG. 14, the master 12 can surely detect the occurrence of the one-bit error. In addition, upon the detection of the error, in order to avoid the occurrence of a conflict, the master 12 transmits an additional clock, temporarily transits to read data (ignores all data received), and then performs the master abort process.

Figure 15:
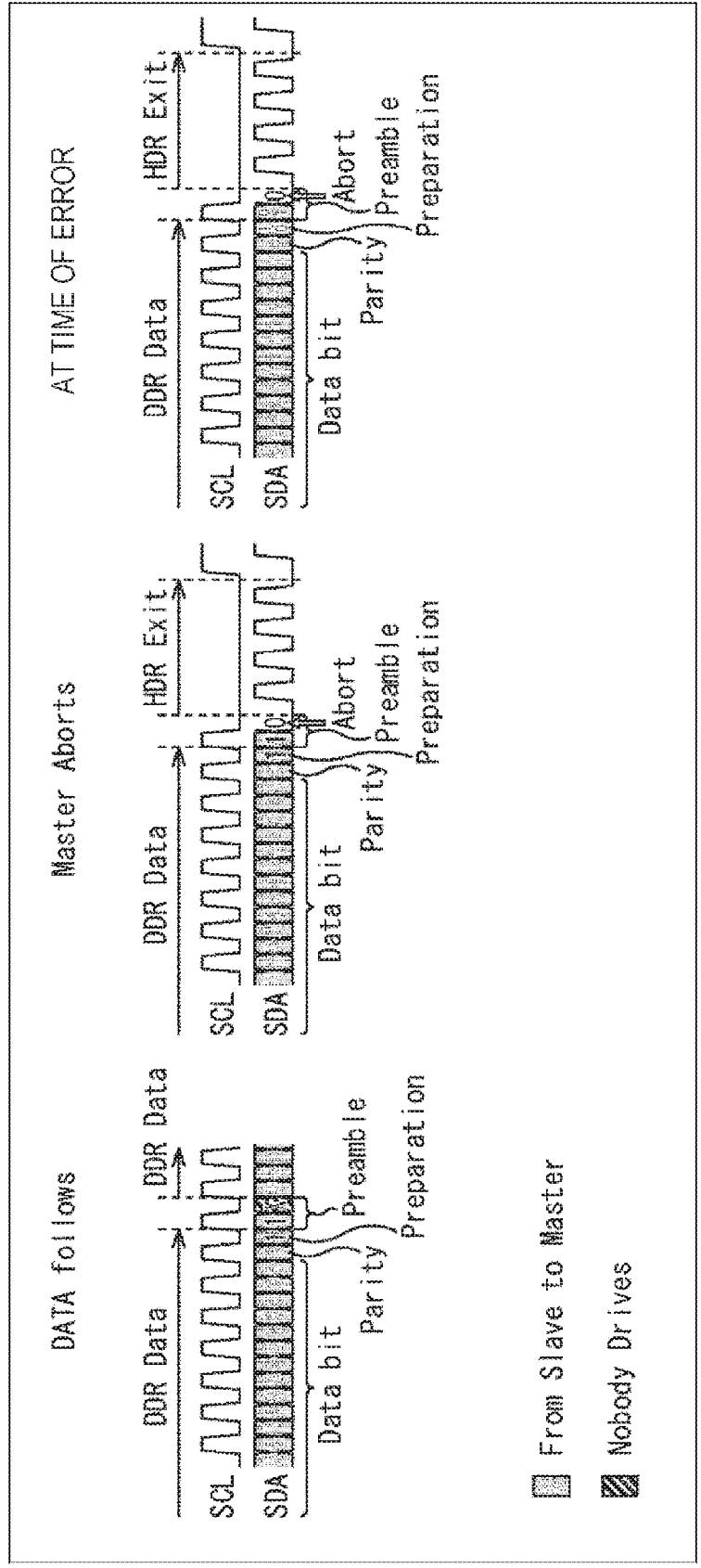
FIG. 15 is a diagram illustrating an example where a one-bit error occurs in a preparation bit and a preamble when read data is transmitted subsequent to read data.

FIG. 15 illustrates an example where a one-bit error occurs in a preparation bit and a preamble when read data is transmitted subsequent to read data.

As illustrated in the left side of FIG. 15, when the read data is transmitted subsequent to the read data, the preparation bit and the first bit of the preamble are driven to 1 (ppr: 1, pre[1]: 1). Incidentally, the master 12 drives the second bit of the preamble to 1 or 0. However, if the master 12 does not perform a master abort, the second bit is not driven, and the slave 13 does not refer to the value of the second bit.

As illustrated in the center of FIG. 15, the master 12 drives the second bit of the preamble to 0 at the time of a master abort. At this point in time, the slave 13 does not drive the second bit. Accordingly, the master 12 can safely interrupt the processing without the occurrence of a conflict.

In addition, the two-bit combination of the preparation bit and the first bit of the preamble can take only (ppr: 1, pre[1]: 1) or (ppr: 0, pre[1]: 0). Accordingly, when an error occurs as illustrated in the right side of FIG. 15, the master 12 can surely detect the occurrence of the one-bit error. In addition, the master 12 performs the master abort process when having detected the error.

Figure 16:
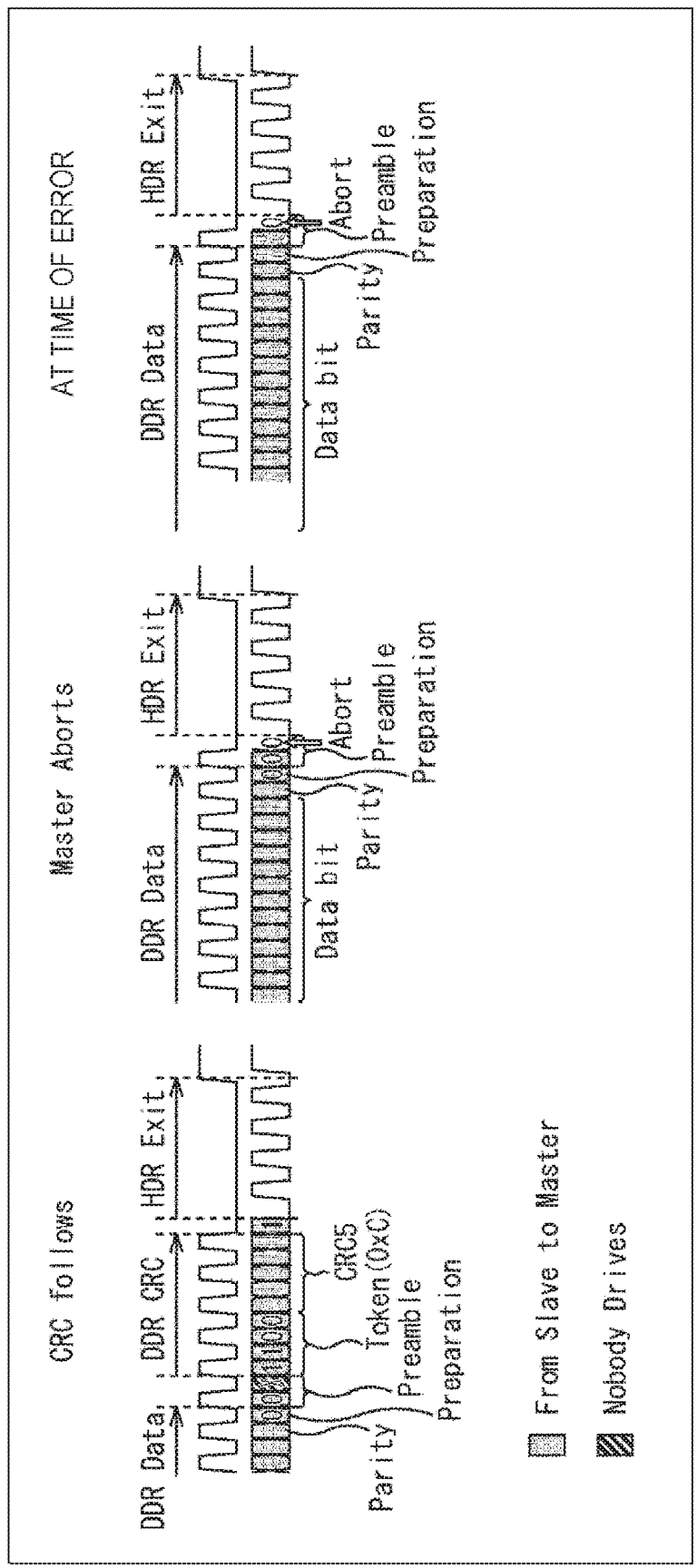
FIG. 16 is a diagram illustrating an example where a one-bit error occurs in a preparation bit and a preamble when a CRC word is transmitted subsequent to a read command.

FIG. 16 illustrates an example when a one-bit error occurs in a preparation bit and a preamble when a CRC word is transmitted subsequent to read data.

As illustrated in the left side of FIG. 16, when the CRC word is transmitted subsequent to the read data, the preparation bit and the first bit of the preamble are driven to 0 (ppr: 0, pre[1]: 0). Incidentally, the master 12 drives the second bit of the preamble to 1 or 0. However, when the master 12 does not perform a master abort, the second bit is not driven, and the slave 13 does not refer to the value of the second bit.

As illustrated in the center of FIG. 16, the master 12 drives the second bit of the preamble to 0 when performing a master abort. At this point in time, the slave 13 does not drive the second bit. Accordingly, the master 12 can safely interrupt the processing without the occurrence of a conflict.

In addition, the two-bit combination of the preparation bit and the first bit of the preamble can take only (ppr: 1, pre[1]: 1) or (ppr: 0, pre[1]: 0). Accordingly, when an error occurs as illustrated in the right side of FIG. 16, the master 12 can surely detect the occurrence of the one-bit error. In addition, the master 12 performs the master abort process when having detected the error.

As illustrated in FIGS. 14 to 16, it is possible to avoid the occurrence of a conflict and ensure communication more reliably without deadlock in the bus IF 11.

Incidentally, the present technology is not limited to the bus IF 11 pursuant to the specification of I3C, and can be applied to the bus IF 11 pursuant to another specification. Moreover, in the bus IF 11 illustrated in FIG. 1, the configuration example where the slaves 13-1 to 13-3 are connected is illustrated. However, the number of the slaves 13 can be, for example, one or two, or may be three or more.

Incidentally, the processes described with reference to the above-mentioned flowchart are not necessarily required to be performed in chronological order along the order described as the flowchart, and also include a process to be executed in parallel or individually (for example, parallel processing or processing with objects).

Moreover, a program may be processed by one CPU, or may be processed by a plurality of CPUs in a distributed manner.

Moreover, in the present description, a system indicates all apparatuses including a plurality of apparatuses.

Moreover, the above-mentioned series of processes can also be executed by hardware or software. If the series of processes is executed by software, a program configuring the software is installed from a program recording medium where the program is recorded into a computer integrated into dedicated hardware, or for example, a general-purpose personal computer that can execute various functions by installing various programs.

<Configuration Example of Hardware>

Figure 17:
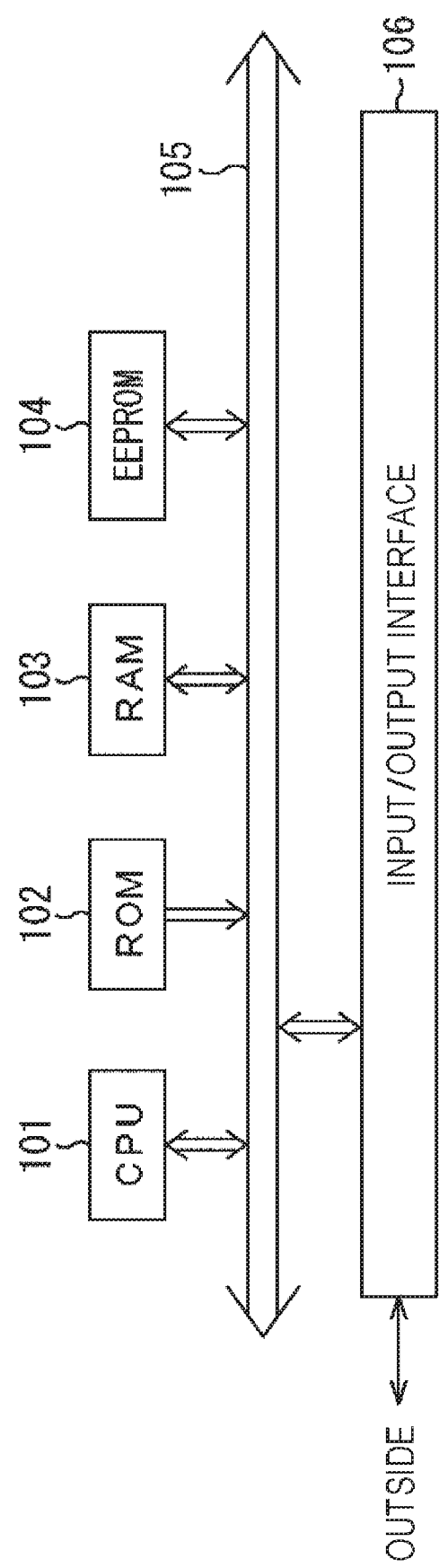
FIG. 17 is a block diagram illustrating a configuration example of one embodiment of a computer to which the present technology is applied.

FIG. 17 is a block diagram illustrating a configuration example of hardware of a computer that executes the above-mentioned series of processes with a program.

In the computer, a central processing unit (CPU) 101, a read only memory (ROM) 102, a random access memory (RAM) 103, and an electronically erasable and programmable read only memory (EEPROM) 104 are interconnected by a bus 105. The bus 105 is further connected to an input/output interface 106. The input/output interface 106 is connected to the outside (for example, the data signal line 14-1 and the clock signal line 14-2 in FIG. 1).

In the computer configured as described above, the CPU 101 loads programs stored in, for example, the ROM 102 and the EEPROM 104 into the RAM 103 via the bus 105 to execute them. Accordingly, the above-mentioned series of processes is performed. Moreover, the programs to be executed by the computer (the CPU 101) are written in advance in the ROM 102. In addition, the programs to be executed by the computer (CPU 101) can be installed and updated in the EEPROM 104 from the outside via the input/output interface 106.

Incidentally, the present technology can also take the following configurations:

(1)

A communication apparatus including a transmission and receiving unit configured to transmit and receive signals to and from another communication apparatus, wherein the transmission and receiving unit receives read data read out from the other communication apparatus, and typically drives the second bit of a preamble transmitted/received subsequent to the read data.

(2)

The communication apparatus according to (1), wherein the transmission and receiving unit notifies the other communication apparatus that communication is or is not interrupted at some midpoint, irrespective of which of read data and a cyclic redundancy check (CRC) data to be read out next is, on the basis of the second bit of the preamble.

(3)

The communication apparatus according to (1) or (2), wherein the transmission and receiving unit transmits write data to be written into the other communication apparatus, and drives the first and second bits of a preamble to be transmitted to the other communication apparatus subsequent to the write data in such a manner as to invert values of the first and second bits.

(4)

The communication apparatus according to (1) or (2), wherein the transmission and receiving unit transmits write data to be written into the other communication apparatus, and drives the first and second bits of a preamble to be transmitted to the other communication apparatus subsequent to the write data in such a manner as to transmit the same value twice to the first and second bits.

(5)

The communication apparatus according to any of (1) to (4), wherein the transmission and receiving unit designates a cyclic redundancy check (CRC) or data for transmission subsequent to the preamble, using the preamble.

(6)

The communication apparatus according to any of (1) to (5), wherein the transmission and receiving unit transmits a one-bit preparation bit to add redundancy to the preamble.

(7)

The communication apparatus according to (6), wherein the transmission and receiving unit uses one bit of the preparation bit and two bits of the preamble to transmit the same signal twice.

(8)

The communication apparatus according to any of (1) to (7), further including: an error detection unit configured to compare a bit string of a signal received subsequent to a preamble received by the transmission and receiving unit, the preamble designating a type of data for next transmission, and a bit string to be transmitted of the type designated by the preamble for transmission to detect occurrence of an error; and a conflict avoidance unit configured to, upon the error detection unit having detected the occurrence of an error, instruct the transmission and receiving unit to transmit a clock in accordance with a predetermined number of bits subsequent to the preamble, and then transmit an abort signal that instructs interruption of communication at some midpoint.

(9)

The communication apparatus according to any of (1) to (8), further including: an acknowledge signal detection unit configured to detect an acknowledge signal or negative acknowledge signal transmitted from the other communication apparatus that has received a signal transmitted from the transmission and receiving unit; and a conflict avoidance unit configured to, upon the acknowledge signal detection unit having detected the negative acknowledge signal, instruct the transmission and receiving unit to ignore a predetermined number of bits subsequent to the negative acknowledge signal, and then transmit an abort signal that instructs interruption of communication at some midpoint.

(10)

The communication apparatus according to (8), wherein the error detection unit sets one of two-bit parity included in the data as even parity, and the other as odd parity, performs a parity check on the data received by the transmission and receiving unit, and accordingly detects the occurrence of the error.

(11)

The communication apparatus according to any of (1) to (10), wherein the transmission and receiving unit drives a data signal line on the basis of a bit immediately after receipt of a cyclic redundancy check (CRC) word transmitted by the other communication apparatus driving the data signal line.

(12)

The communication apparatus according to any of (1) to (11), wherein the transmission and receiving unit is capable of transmitting and receiving signals in standard data rate (SDR) mode where data is communicated at a normal transfer rate, and in high data rate (HDR) mode where data is communicated at a transfer rate higher than the SDR mode.

(13)

The communication apparatus according to any of (1) to (12), wherein the transmission and receiving unit communicates via two signal lines of a data signal line that transmits serial data sequentially bit by bit, and a clock signal line that transmits a serial clock at a predetermined frequency.

(14)

The communication apparatus according to any of (1) to (13), wherein the transmission and receiving unit communicates pursuant to a specification of the improved inter integrated circuit (I3C).

(15)

A communication method including causing a transmission and receiving unit configured to transmit and receive signals to and from another communication apparatus to:

receive read data read out from the other communication apparatus; and typically drive the second bit of a preamble transmitted/ received subsequent to the read data.

(16)

A program causing a computer to execute a communication process including causing a transmission and receiving unit configured to transmit and receive signals to and from another communication apparatus to:

receive read data read out from the other communication apparatus, and typically drive the second bit of a preamble transmitted/ received subsequent to the read data.

(17)

A communication system including:

a first communication apparatus having an initiative of control over a bus; and a second communication apparatus configured to communicate under control of the first communication apparatus, wherein the first communication apparatus includes a transmission and receiving unit configured to transmit and receive signals to and from the second communication apparatus, and the transmission and receiving unit receives read data read out from the second communication apparatus, and typically drives the second bit of a preamble transmitted/ received subsequent to the read data.

Incidentally, embodiments are not limited to the above-mentioned embodiment. Various modifications can be made within the scope that does not depart from the gist of the present disclosure.

REFERENCE SIGNS LIST

11 Bus IF
12 Master
13 Slave
14-1 Data signal line
14-2 Clock signal line
21 Transmission and receiving unit
22 Error detection unit
23 Acknowledge signal detection unit
24 Conflict avoidance unit
31 Transmission and receiving unit
32 Error detection unit

The invention claimed is:

1. A communication device, comprising:

transmission and reception circuitry configured to communicate with an external communication device, including transmitting and receiving data via a data signal line and transmitting a clock via a clock signal line; and control circuitry configured to detect at least one of an acknowledgement signal or an absence of an acknowledgement signal transmitted from the external communication device in response to received data by the transmission and reception circuitry, in a case where the control circuitry detects the absence of an acknowledgement signal, cause the transmission and reception circuitry to prevent a conflict for at least a first predetermined number of bits following the absence of an acknowledgement signal, and detect an occurrence of an error in the received data by comparing a first bit sequence following a preamble of the received data to a second bit sequence corresponding to a data type designated by the preamble, and in a case where the occurrence of the error is detected, cause the transmission and reception circuitry to transmit the clock for a first duration corresponding to at least a second predetermined number of bits following the preamble.

2. The communication device according to claim 1, wherein when the preamble of the received data specifies transmission of a cyclic redundancy check (CRC) word, the CRC word including a token and a CRC-5, and the control circuitry detects an occurrence of at least one of a token error or a CRC error on the basis of the first bit sequence, the transmission and reception circuitry transmits a command signal after transmitting the clock for a second duration according to at least a number of bits in the CRC word and after transmitting an additional clock for the first duration, the second predetermined number of bits corresponding to a difference between the number of bits in the CRC word and a number of bits in the received data.

3. The communication device according to claim 2, wherein the control circuitry ignores the received data for at least a period during transmission of the additional clock.

4. The communication device according to claim 3, wherein the transmission and reception circuitry transmits the command signal at a timing of a second bit of a preamble of the data transmitted.

5. The communication device according to claim 2, wherein the transmission and reception circuitry drives the data signal line from a bit immediately after receiving a cyclic redundancy check (CRC) word transmitted by the external communication device driving the data signal line.

6. The communication device according to claim 1, wherein the control circuitry is further configured to detect the at least one of the acknowledgement signal or the absence of the acknowledgement signal on the preamble of the received data after a read command, and to detect the occurrence of an error in the received data on a cyclic redundancy check (CRC) word of the received data.

7. The communication device according to claim 1, wherein the control circuitry is configured to detect that the error has occurred if a number of bits in the second bit sequence is smaller than a number of bits in the first bit sequence.

8. The communication device according to claim 1, wherein
the control circuitry is configured to detect, by the comparing, that the error has occurred if a first one-bit error occurs in a first bit of the preamble, and
the detection of the absence of the acknowledgement signal by the control circuitry is a result of a second one-bit error in a second bit of the preamble transmitted from the external communication device.

9. The communication device according to claim 1, wherein the transmission and reception circuitry drives a second bit of a preamble transmitted or received following a read data.

10. The communication device according to claim 1, wherein the transmission and reception circuitry transmits a command instructing to either terminate or restart communication in a particular communication mode following a conflict prevention clock period, wherein the conflict prevention clock period has a duration corresponding to at least the first predetermined number of bits following the absence of an acknowledgement signal.

11. The communication device according to claim 1, wherein the control circuitry includes a state machine configured to ignore a conflict prevention clock period having a duration corresponding to at least the first predetermined number of bits following the absence of an acknowledgement signal.

12. The communication device according to claim 1, wherein the transmission and reception circuitry transmits a number of clock cycles when the absence of an acknowledgement signal is detected, the number of clock cycles being the same as the first predetermined number of bits following the absence of an acknowledgement signal.

13. The communication device according to claim 1, wherein
the transmission and reception circuitry is able to transmit the data and receive the acknowledgement signal a standard data rate (SDR) mode in which data communication is conducted at a first transfer rate, and at least one high data rate (HDR) mode in which data communication is conducted at a second transfer rate, the second transfer rate being higher than the first transfer rate, and
the at least one HDR mode includes a plurality of additional modes in which the transmission and reception circuitry is capable of communicating, the plurality of additional modes including: a double data rate mode, a ternary symbol pure-bus mode, and a ternary symbol legacy-inclusive-bus mode.

14. The communication device according to claim 13, wherein the communication device is further configured to switch a mode of the external communication device via a mode change signal.

15. The communication device according to claim 13, wherein the transmission and reception circuitry transmits a command giving an instruction to restart communication in the at least one HDR mode after the first duration has elapsed.

16. The communication device according to claim 13, wherein the transmission and reception circuitry transmits a command giving an instruction to exit the at least one HDR mode after the first duration has elapsed.

17. The communication device according to claim 13, wherein the control circuitry is configured to detect an error in a preamble immediately after transmitting a read command in the at least one HDR mode and immediately before a read data.

18. The communication device according to claim 1, wherein the control circuitry detects, by the comparing, the error by performing parity check on the data received by the transmission and reception circuitry wherein a first parity bit contained in the data is an even-numbered parity and a second bit contained in the data is an odd-numbered parity.

19. A communication system, comprising:
a first communication device, including:
first transmission and reception circuitry configured to communicate, including transmitting and receiving data via a data signal line and transmitting a clock via a clock signal line, and
control circuitry configured to
detect an occurrence of an error in received data by the transmission and reception circuitry by comparing a first bit sequence following a preamble of the received data to a second bit sequence corresponding to a data type designated by the preamble,
in a case where the occurrence of the error is detected, cause the first transmission and reception circuitry to transmit the clock for a duration corresponding to at least a first predetermined number of bits following the preamble; and
detect at least one of an acknowledgement signal or an absence of an acknowledgement signal transmitted from the external communication device in response to the received data, and
in a case where the control circuitry detects the absence of an acknowledgement signal, cause the transmission and reception circuitry to prevent a conflict for at least a second predetermined number of bits following the absence of an acknowledgement signal; and
a second communication device, including:
second transmission and reception circuitry configured to communicate with the first communication device, including transmitting and receiving the received data via the data signal line and receiving the clock via the clock signal line,
wherein the second communication device is configured to transmit the first bit sequence to the first communication device.

20. A communication method for a communication device, the method comprising:
communicating with an external communication device, including transmitting and receiving data via a data signal line and transmitting a clock via a clock signal line;
detecting an occurrence of an error in received data by the transmission and reception circuitry by comparing a first bit sequence following a preamble of the received data to a second bit sequence corresponding to a data type designated by the preamble;
in a case where the occurrence of the error is detected, causing the transmission and reception circuitry to transmit the clock for a duration corresponding to at least a first predetermined number of bits following the preamble;
detecting at least one of an acknowledgement signal or an absence of an acknowledgement signal transmitted from the external communication device in response to the received data; and in a case where the control circuitry detects the absence of an acknowledgement signal, preventing a conflict for at least a second predetermined number of bits following the absence of an acknowledgement signal.

* * * * *